(12) United States Patent
Henderson

(10) Patent No.: US 6,612,388 B2
(45) Date of Patent: Sep. 2, 2003

(54) SLED

(76) Inventor: Leland Henderson, 4805 180th Way SW., Rochester, WA (US) 98579

( * ) Notice: Subject to any disclaimer, the term of this patent is extended or adjusted under 35 U.S.C. 154(b) by 0 days.

(21) Appl. No.: 09/931,624

(22) Filed: Aug. 16, 2001

(65) Prior Publication Data

US 2003/0034190 A1 Feb. 20, 2003

(51) Int. Cl.[7] .............................................. B62B 19/00
(52) U.S. Cl. ......................... 180/184; 180/185; 280/16
(58) Field of Search .................................. 180/184, 185, 180/183, 190, 191; 280/16

(56) References Cited

U.S. PATENT DOCUMENTS

| | | | |
|---|---|---|---|
| 2,354,627 A | 7/1944 | Wheeler | |
| 3,692,130 A | * 9/1972 | Stecey, Jr. | ................... 180/5 R |
| 4,036,506 A | 7/1977 | Scheib | |
| 4,114,912 A | 9/1978 | Sweeney | |
| 4,279,427 A | 7/1981 | Kawazoe | |
| 4,348,033 A | * 9/1982 | Stevens | ....................... 280/16 |
| 4,405,140 A | 9/1983 | Stevens | |
| 4,632,408 A | 12/1986 | Oipp et al. | |
| 4,796,902 A | 1/1989 | Capra | |
| 5,029,664 A | * 7/1991 | Zulawski | .................... 180/190 |
| 5,752,709 A | 5/1998 | Melcher | |
| 6,095,275 A | * 8/2000 | Shaw | ......................... 180/185 |
| 6,116,622 A | 9/2000 | Gibbons | |
| 6,260,648 B1 | * 7/2001 | Bessette | ..................... 180/184 |
| 6,279,925 B1 | * 8/2001 | Miller | ....................... 280/22.1 |

* cited by examiner

Primary Examiner—Lesley D. Morris
Assistant Examiner—Tony Winner
(74) Attorney, Agent, or Firm—Thomas W. Secrest

(57) ABSTRACT

There is a self-propelled mobile sled which can be maneuvered over various terrains such as earth, slopes, hills, rocks, snow, and ice. The sled, in various modifications, can be used as a toy; as a rescue vehicle; and an observation vehicle. The size of the sled can vary to adjust to the desired task.

20 Claims, 21 Drawing Sheets

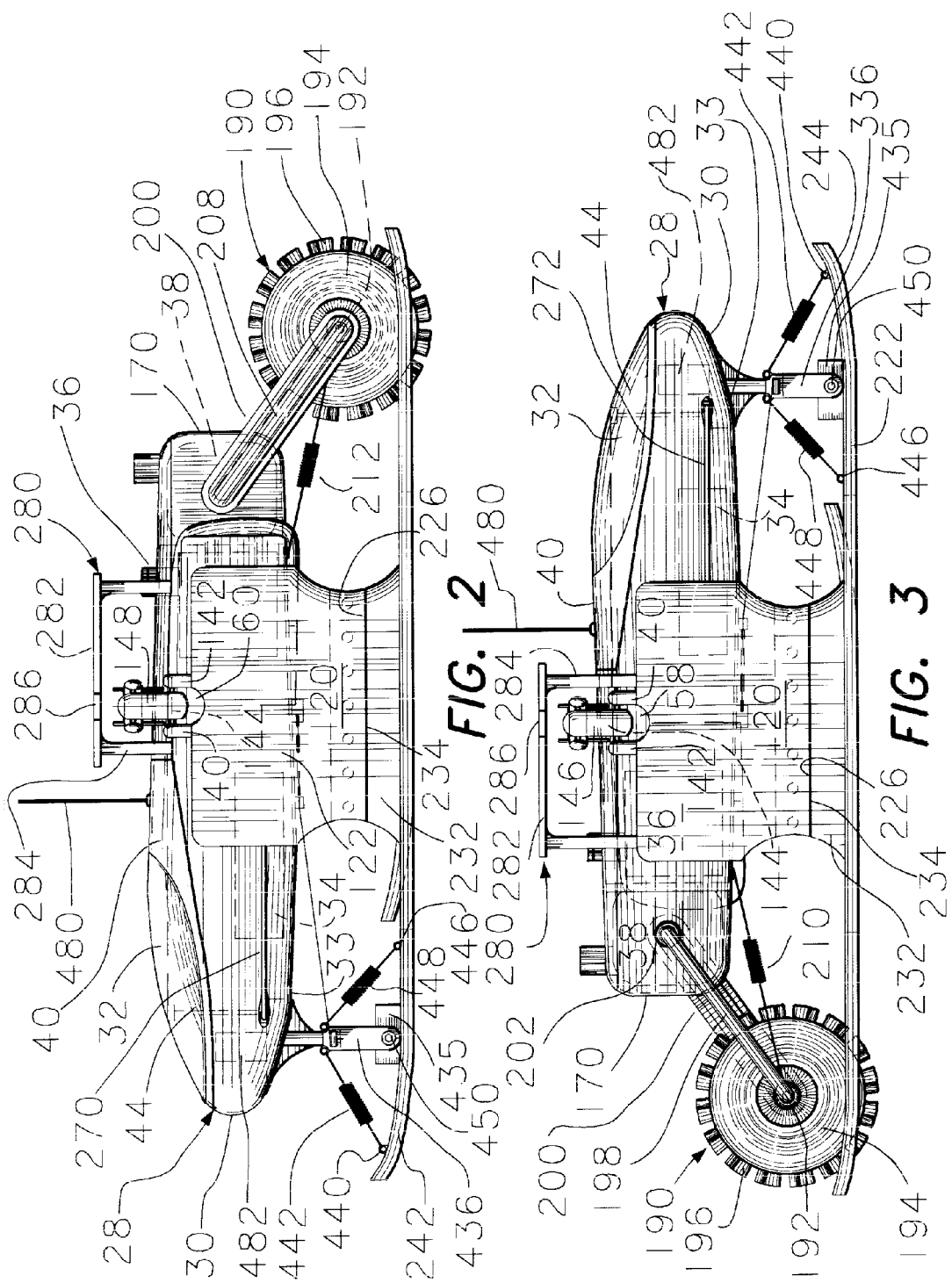

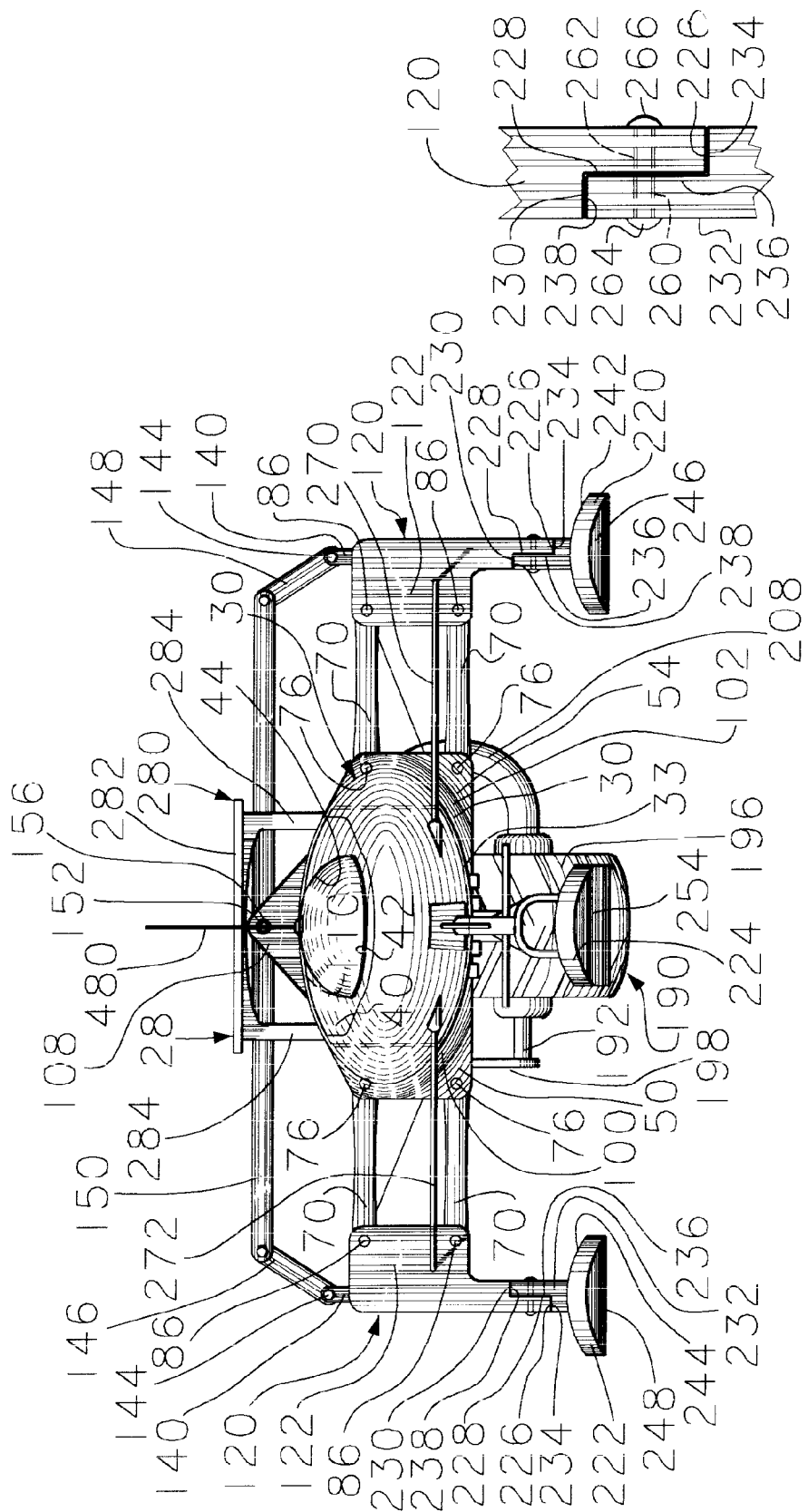

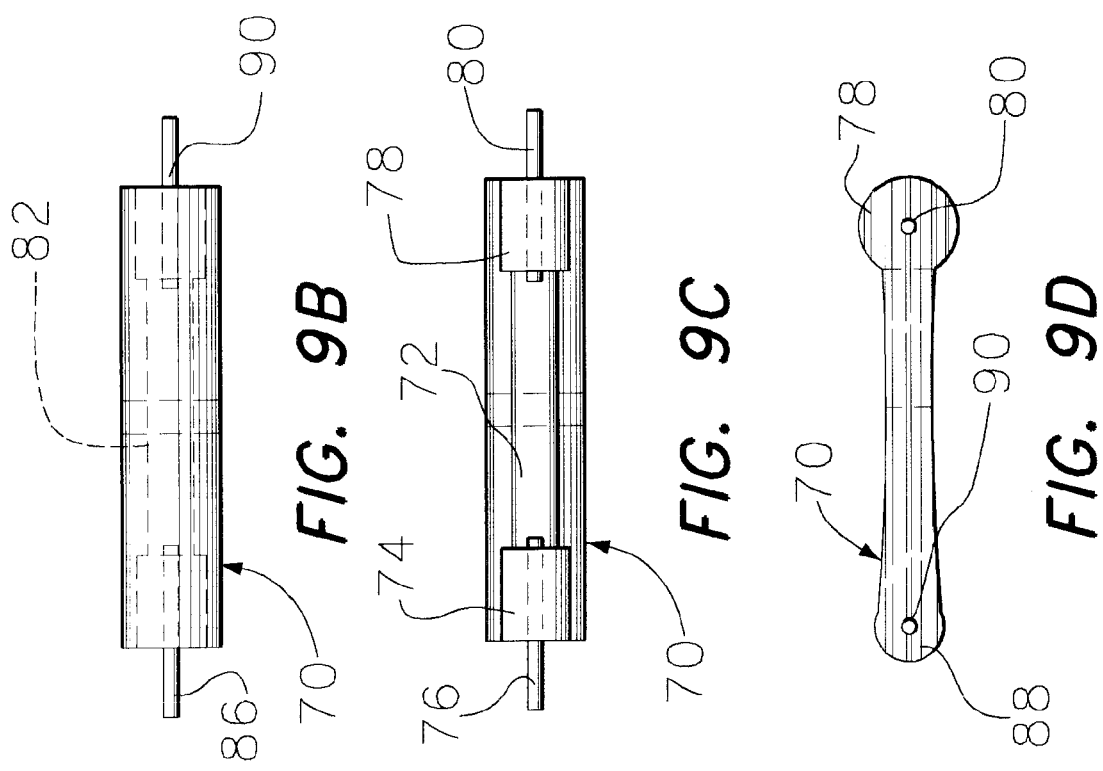
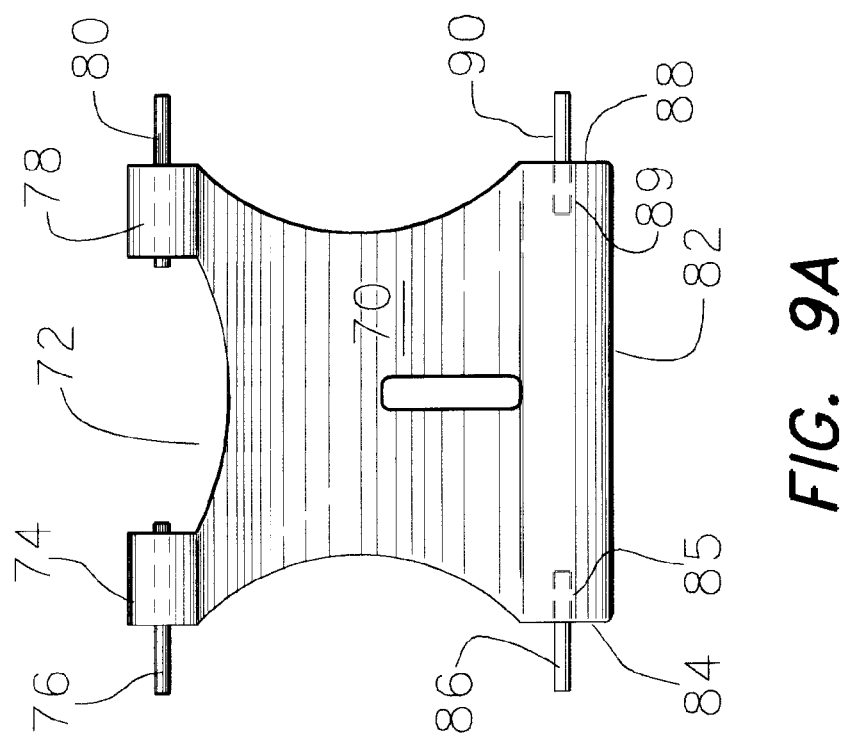

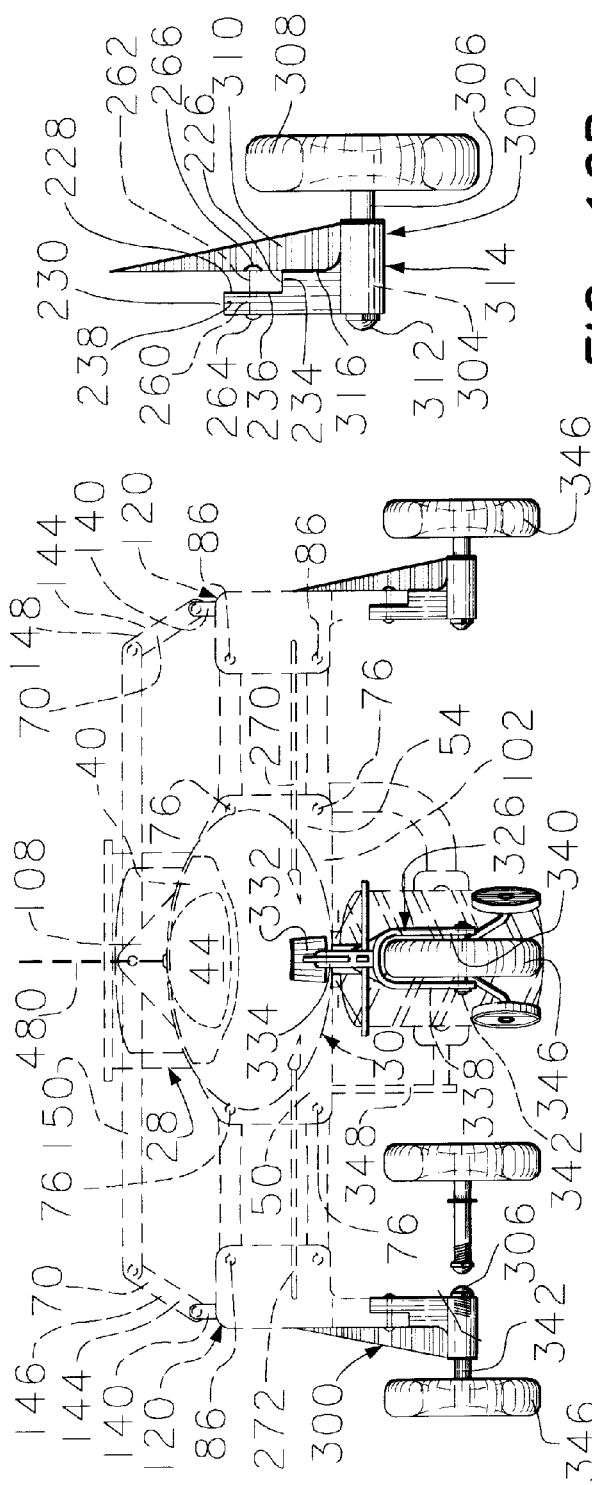

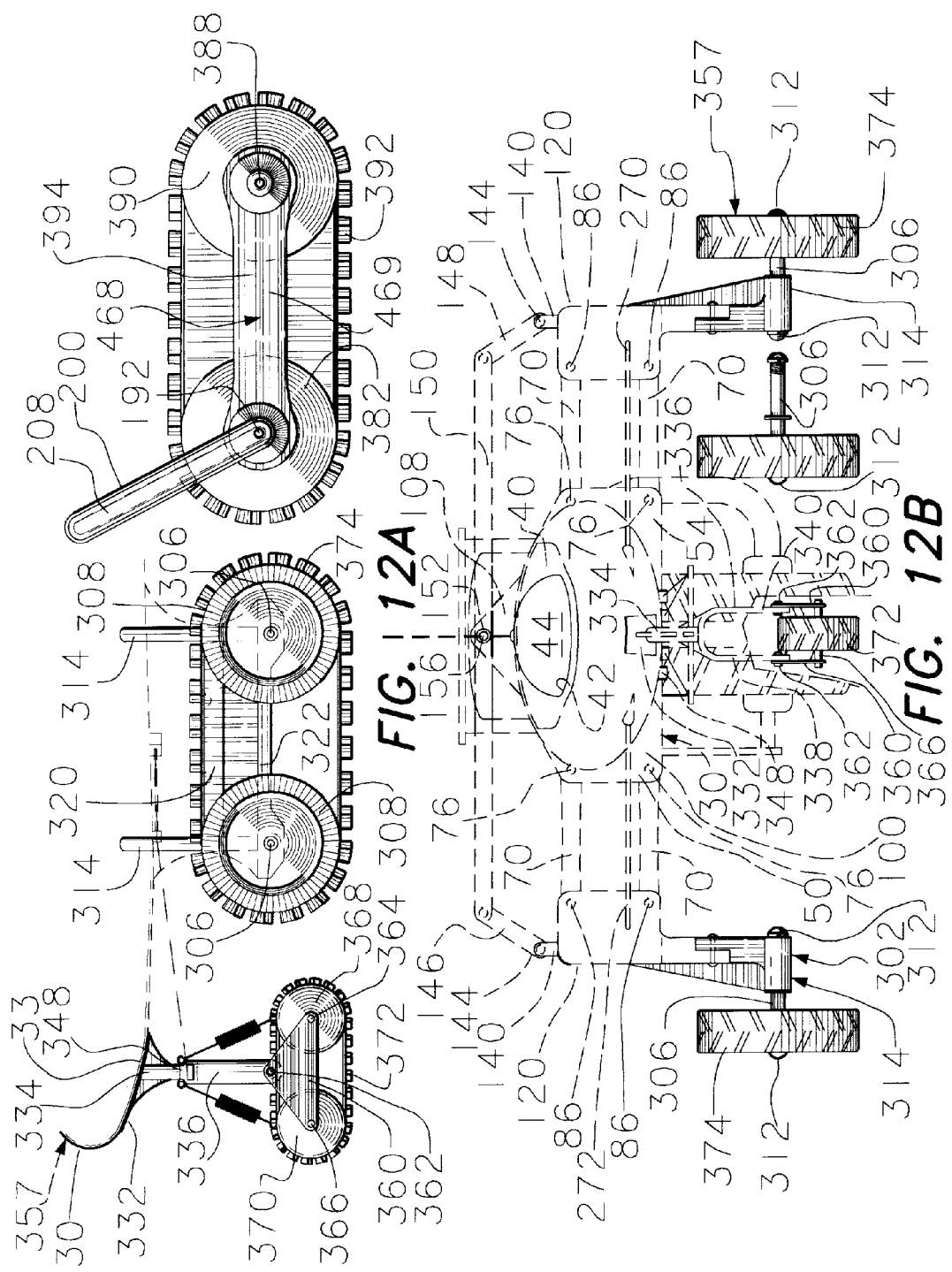

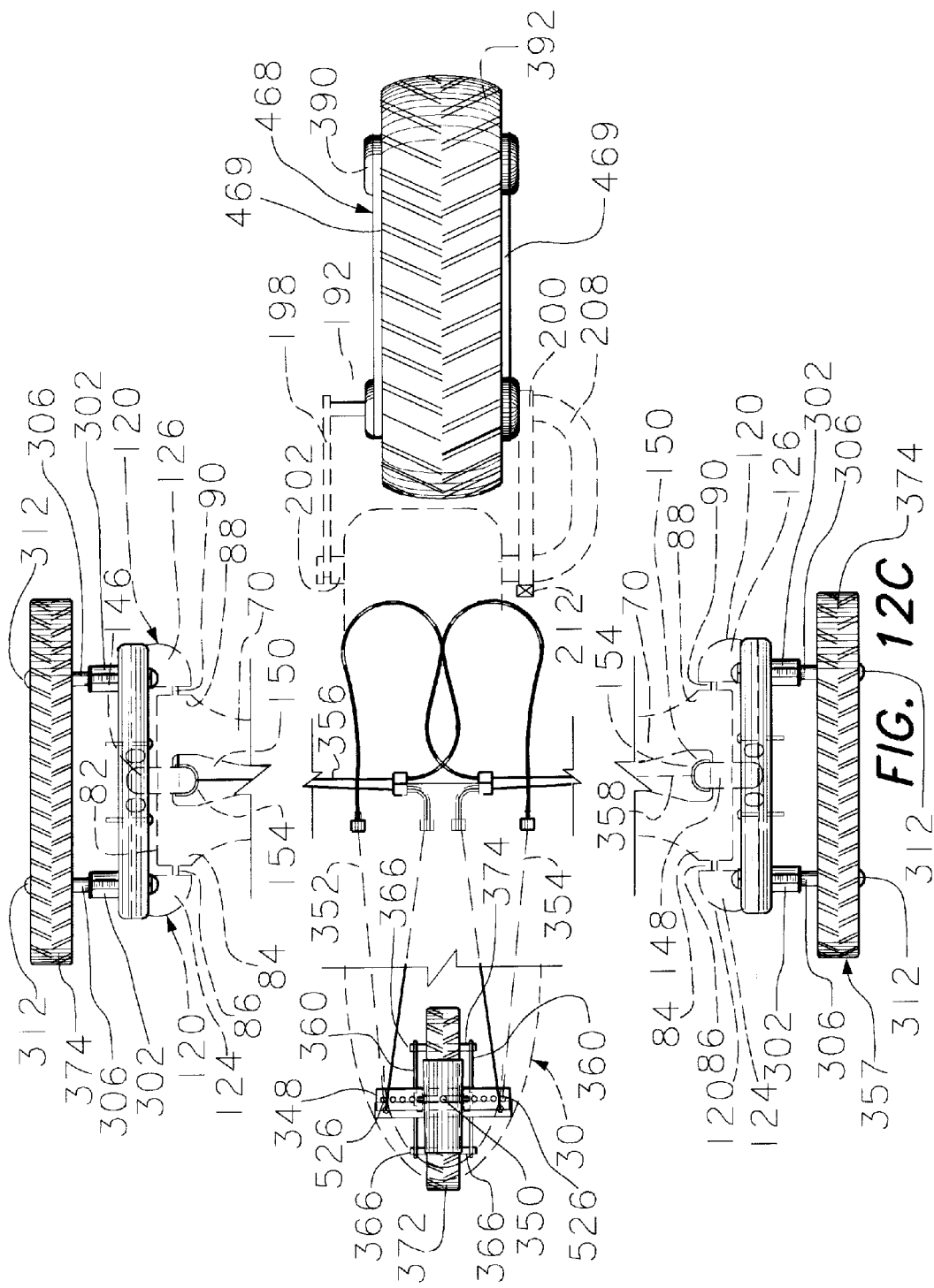

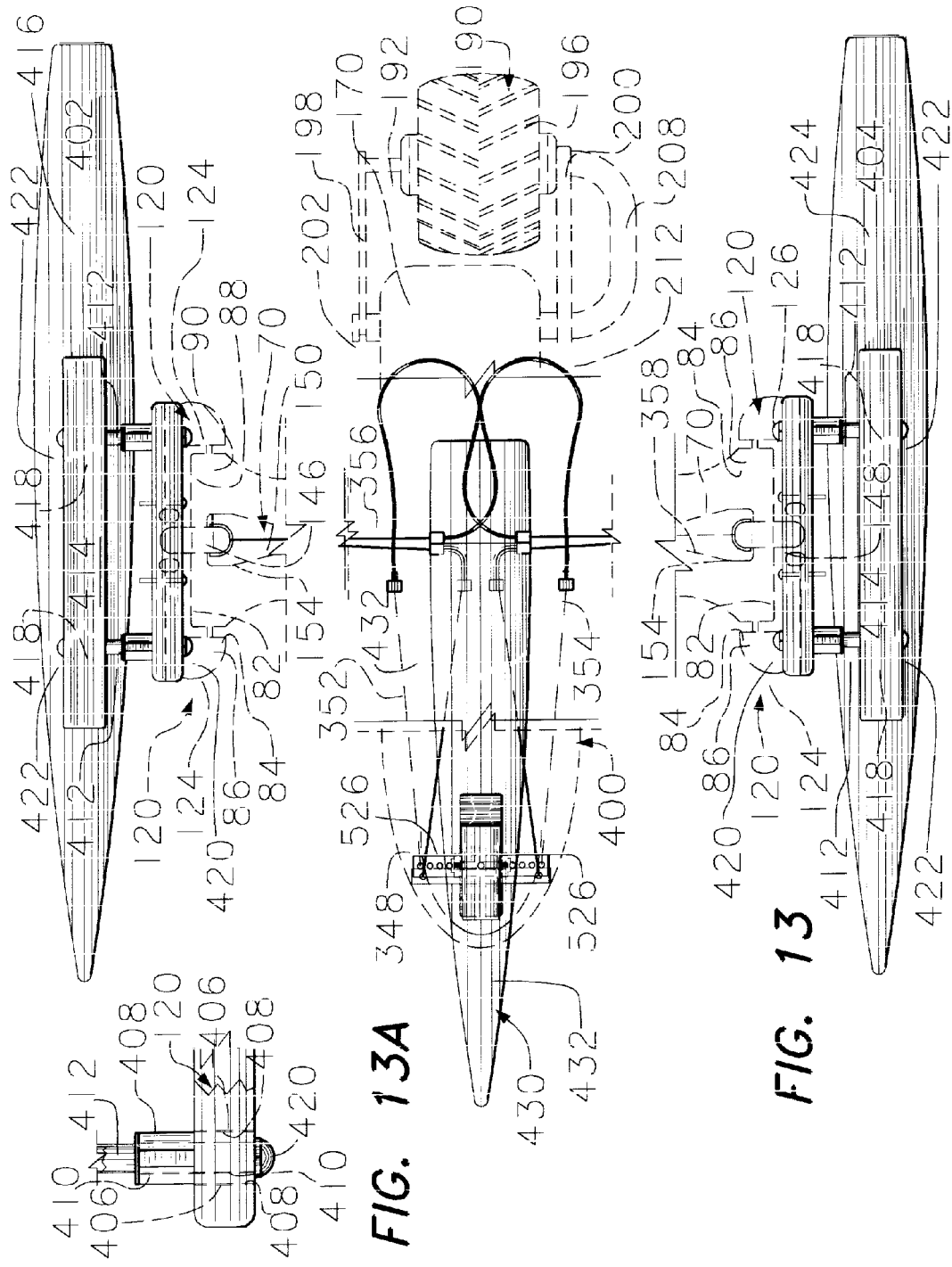

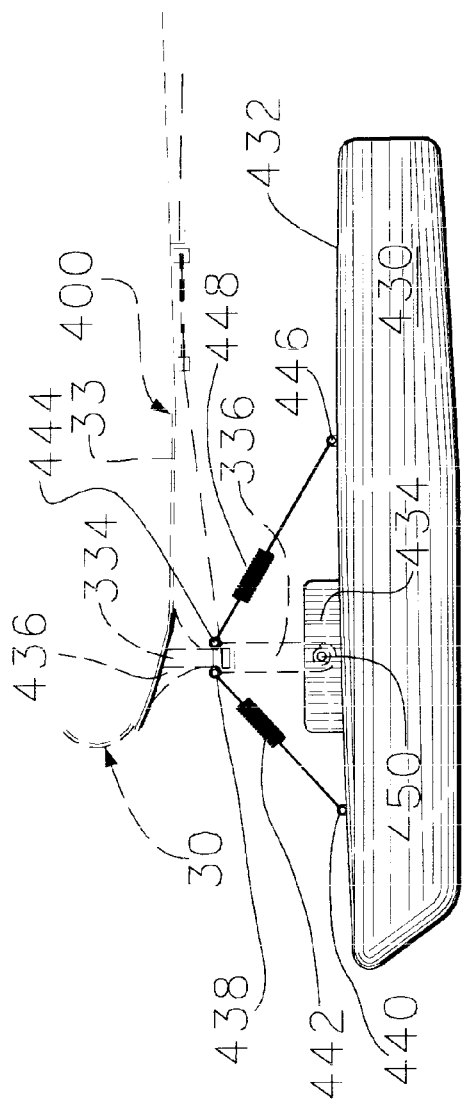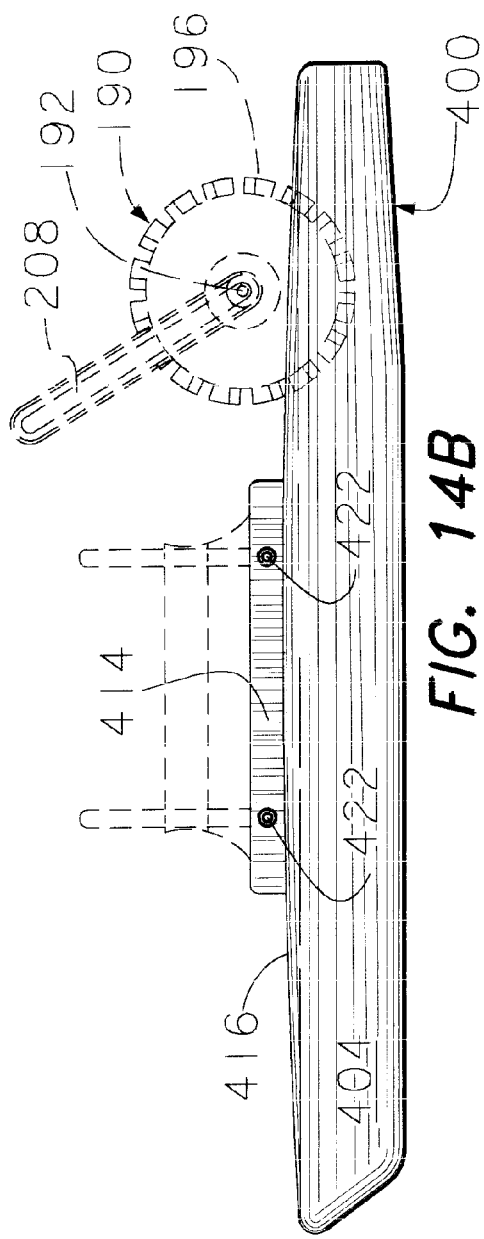
FIG. 14A
FIG. 14B

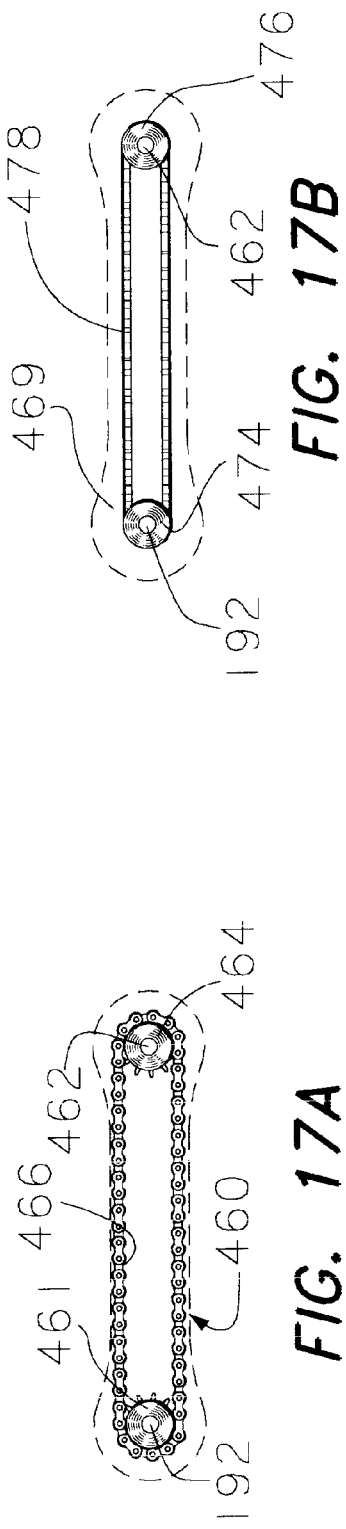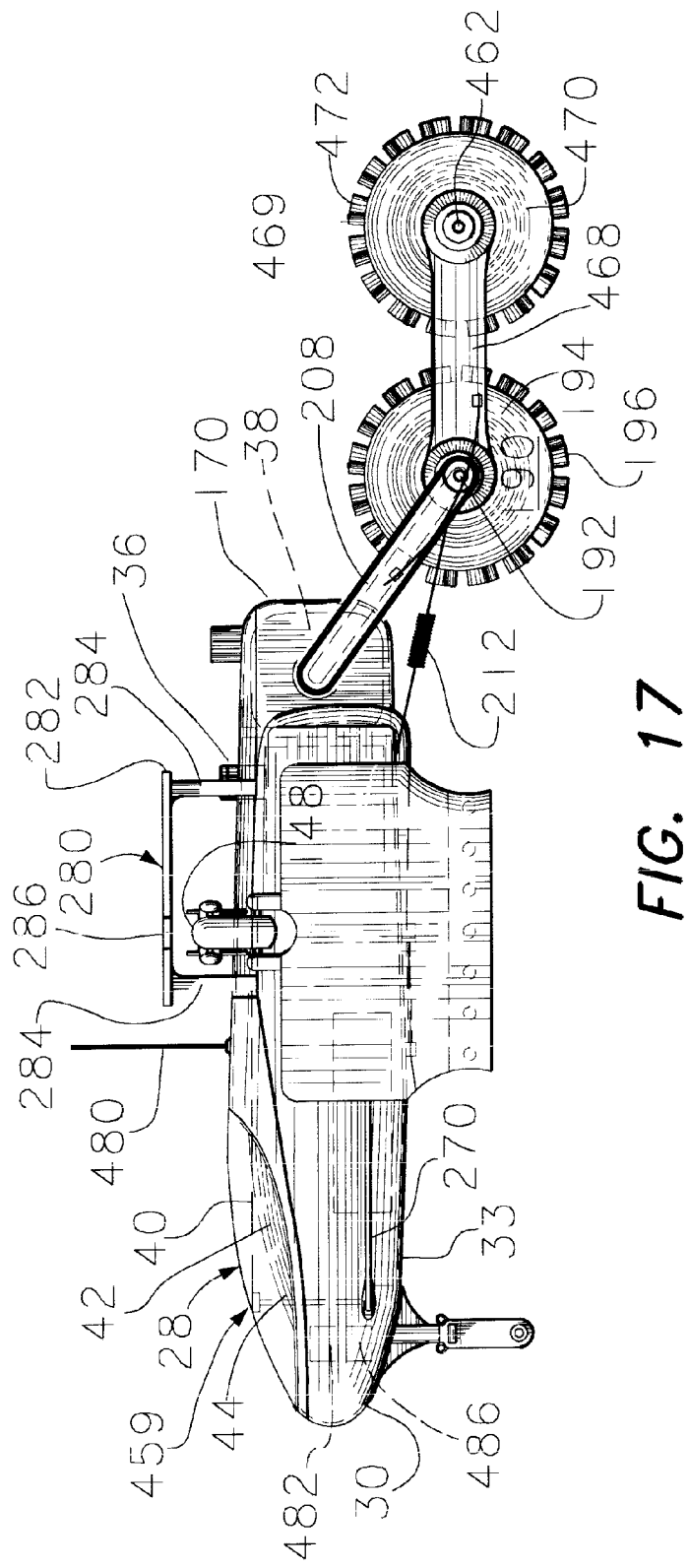

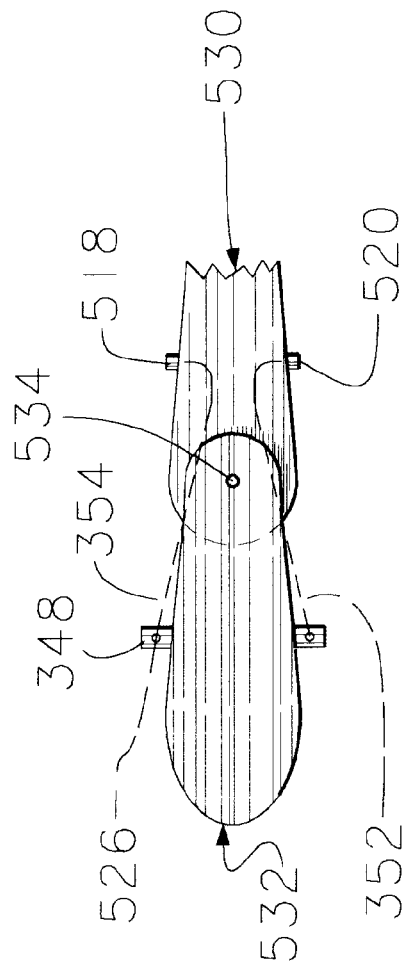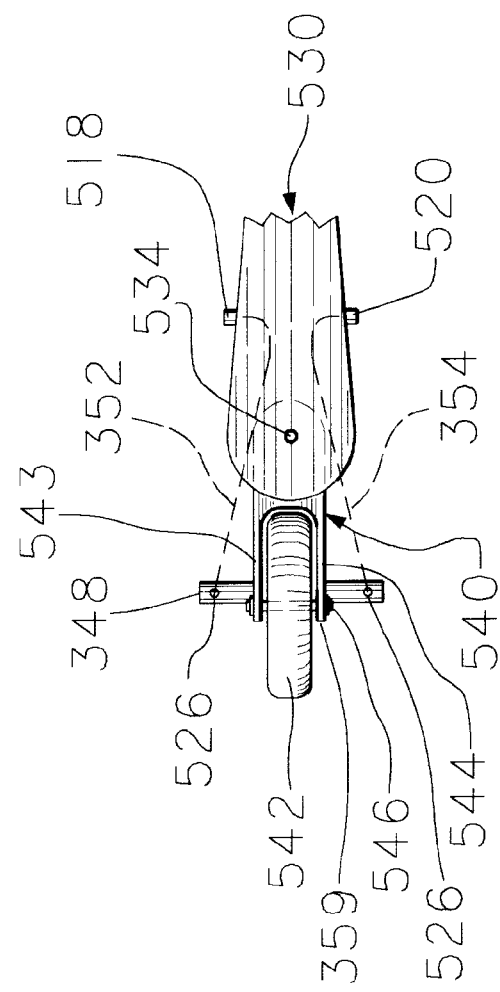

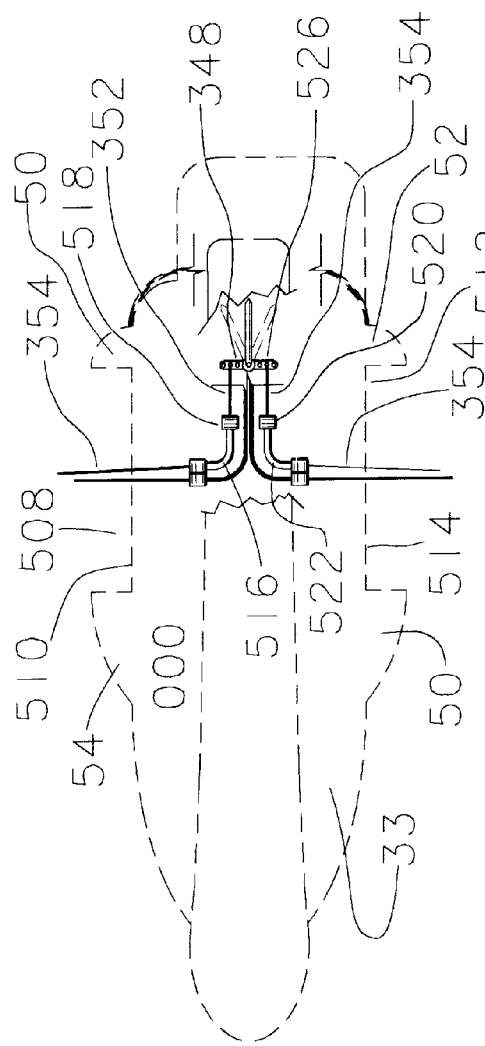
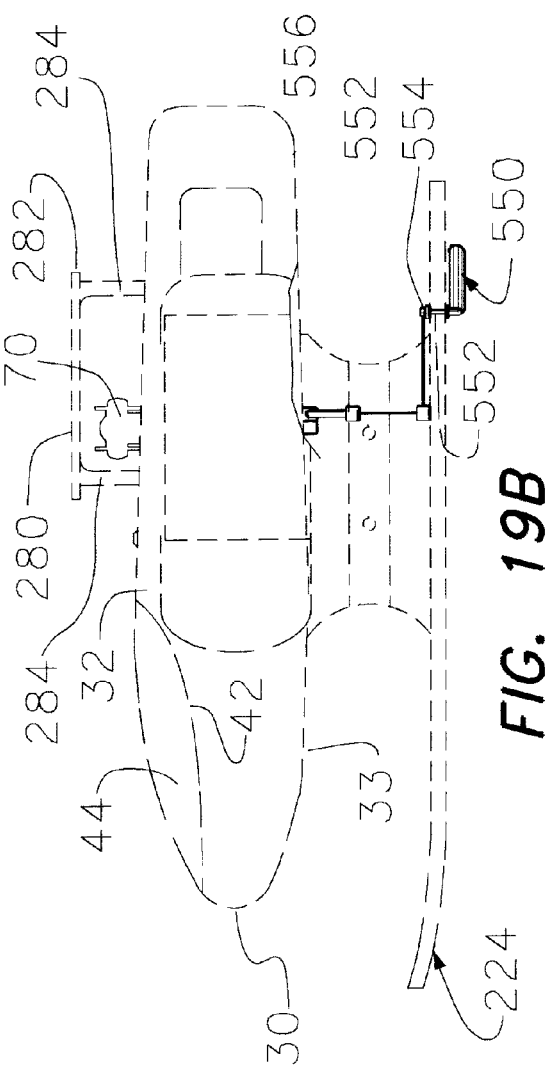

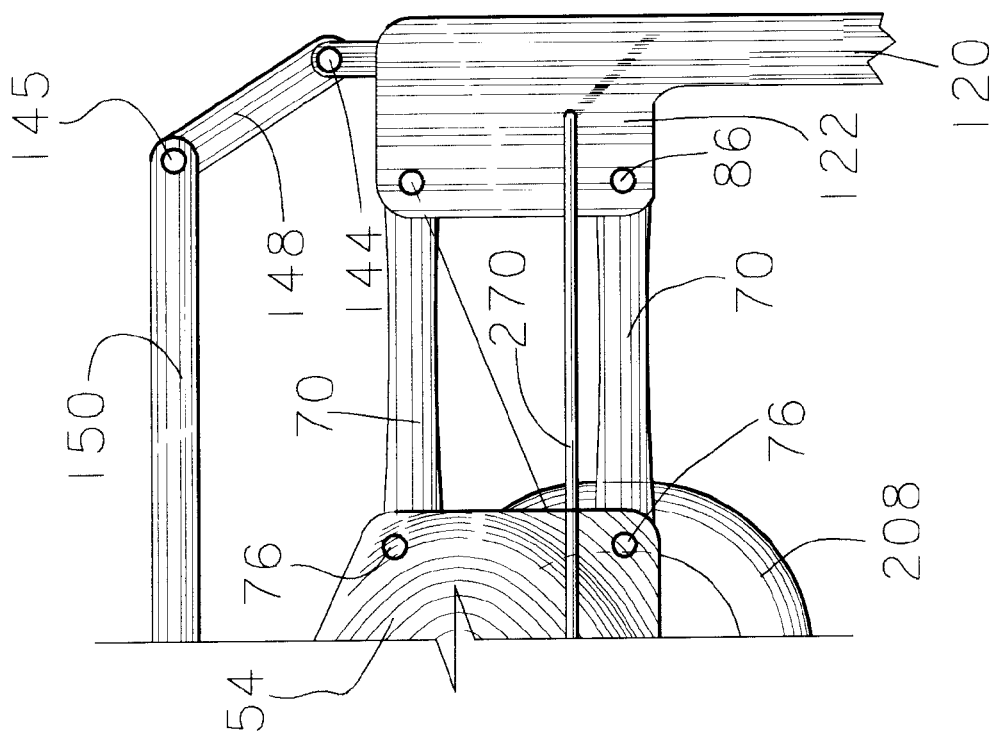
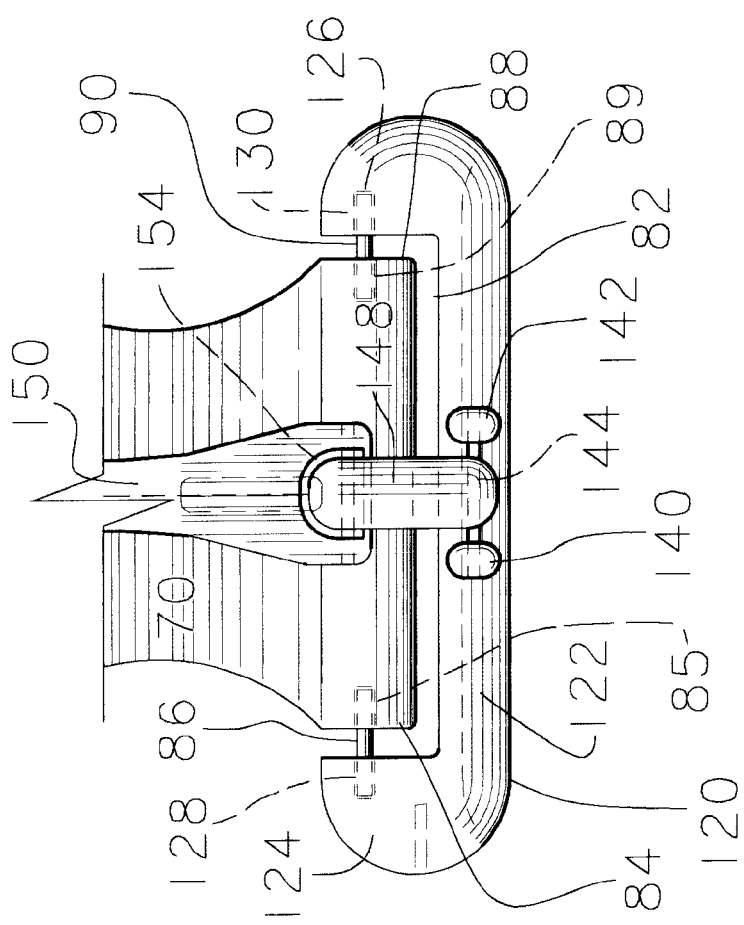
FIG. 20B
FIG. 20A

SLED

CROSS-REFERENCES TO RELATED PATENT APPLICATIONS (if any)

There is no related application.

STATEMENT AS TO RIGHTS TO INVENTIONS MADE UNDER FEDERALLY SPONSORED RESEARCH AND DEVELOPMENT (if any)

This invention was developed with private funds and there was no federally assisted funds.

REFERENCE TO A "MICROFICHE APPENDIX"

This section is not applicable to this subject matter.

BACKGROUND OF THE INVENTION

1. Field of the Invention

The sled is a mobile mechanical unit which can traverse various types of terrain. For example, the earth can be level or it can be a slope or a hill. The earth can be rough or smooth such as gravel or an asphalt or concrete path. The terrain can be snow or ice. Also, the terrain can be water. The sled can move over the foregoing types of terrain.

The sled can be self-propelled and may be electrically operated from a battery or from electric wires. The sled may comprise an internal combustion engine such as gasoline, kerosene, diesel, alcohol, or gas such as natural gas or a synthetic gas.

The sled can be used as a remotely controlled toy which can maneuver in various terrains from flat to hilly to rocky to smooth.

The sled can be used as a rescue vehicle. A rope can be attached to the sled and the sled maneuvered over ice or snow or water or other terrain to place the rope near a person who is stranded and needs to be pulled away from the stranded location. For example, a person may have walked on ice and the ice may have broken. The ice cannot support a person but can support the sled. A rope can be attached to the sled and the sled maneuvered to be close to the person so that the person can grab onto the rope and be pulled out of the frozen water and out of the ice.

The sled may be used for observation purposes such as a camera being mounted on the sled and the sled moved in close proximity to an object to be observed. Or, a television camera may be mounted on the sled and the television pictures transmitted to a remote location.

The sled may be used for transportation means to move a person or an object from a first location to a second location.

The sled may have a detection means. A person buried in an avalanche may have a transmitter for electromagnetic waves. The sled may have a receiver for the electromagnetic waves. The sled can be moved over the terrain to pick up the transmitted electromagnetic waves from the person buried in the avalanche. It may be possible to reach the person buried in the avalanche in sufficient time so that the person does not die or is not seriously hurt.

The sled can be maneuvered into inaccessible places or into a building or into a cave for observation and rescue purposes.

Another use of the sled can be used for destructive purposes. An explosive can be mounted on the sled and the sled maneuvered into an area which is difficult or dangerous to access. The explosive can be exploded.

2. Description of the Related Art Including Information Disclosed Under 37CFR 1.97 and 37 CFR 1.98

A patent search was made by the applicant at the Engineering Library at the University of Washington in Seattle, Wash. The applicant did not find a conflicting invention in the patent search.

In toy stores there are miniature automotive vehicles which are generally battery powered. There is a remote control for the miniature automotive vehicle. A person can activate the vehicle and from a remote position maneuver the vehicle as it moves in a house or a basement or a building.

It is the understanding of the applicant that in avalanche prone areas there may be a mobile vehicle to assist in finding a person buried in the avalanche. The operation of this vehicle for trying to find a person buried in the avalanche is contemplated patent search.

The applicant's subject invention comprises a propelling means which is mechanical. The invention may have skis or wheels or an endless track or pontoons. There is a servo motor which assists in guiding the direction of movement of the invention, a sled. A camera may be mounted on the sled to take pictures of inaccessible places. There may be a rescue rope mounted on the sled so that a person can hold on to the rope and be moved. Also, there may be an electromagnetic sensing means on the sled so that a person caught in an avalanche can be located. Also, there can be remote control for the servo motor. There may be an antenna on the sled connecting with the servo motor.

It is argued that none of the references found by the applicant are actually applicable to this invention. One of the references is Wheeler, U.S. Pat. No. 2,354,627. Wheeler comprises a sled having three skis. The sled is manually operable. However, the sled does not have a servo motor and does not have electromagnetic sensing means and does not have a propelling means. The sled of Wheeler is manually propelled. Therefore, Wheeler is not an anticipatory prior art to the subject invention.

Scheib, U.S. Pat. No. 4,036,506, discloses a ski and a steering wheel 31 for changing the direction of movement of the ski and the associated two other skis. Scheib is a sled on which two movable runners in front and two in back are mounted so that they can be tilted on a sled frame, so that the canting axes, running in the direction of travel, are primarily parallel over the sled's contact surface and the runners are connected with each other by at least on jointed parallelogram which transfers the tilting motion. In all, there are four skis in Scheib. Scheib is manually operated and does not have a motor, a servo mechanism, a propelling means, and the like. Therefore, Scheib is not an anticipatory reference to the subject invention.

Sweeney, U.S. Pat. No. 4,114,912, comprises a sled with three skis. An improved sled apparatus of the ski-type having a main ski bearing a seat and a foot retainer thereon, and steerable upon flanking outrigger auxiliary skis by means of a preferably unitary handlebar assembly operatively interconnected to a pivotable stabilizer bar assembly. There is a main central ski and two outrigger skis. There is a place for an operator to sit and to manually control the up and down movements of the outrigger skis. Sweeney does not have a servo apparatus. Sweeney does not have a motor and a propelling means. Sweeney is a manually operated sled.

Kawazoe, U.S. Pat. No. 4,279,427, is for a ski edging device. A ski edging device for a snowmobile includes an articulable joint connected between the snowmobile body and the skis to permit rotation of the skis relative to the body about a steering axis and to permit rotation of the skis relative to the body about a camber axis to control maneuvers to prevent lateral side slipping of the snowmobile. Kawazoe is a manually operated sled or snowmobile and does not have servo equipment, a camera, a rescue means or an electromagnetic sensing means. Also, Kawazoe is manually controlled by a person sitting on the snowmobile and there is no remote controller for the sled. Therefore, Kawazoe is not anticipatory of the subject invention.

Stevens, U.S. Pat. No. 4,405,140, is directed to an improved steering linkage for runners or skis or the like. Stevens is directed to a bobsled which can be used for racing purposes. Stevens is manually operated and manually moved. Stevens does not have servo equipment and does not have a servo motor and is not remotely controlled. Therefore, Stevens is not anticipatory of the subject invention.

Olpp et al, U.S. Pat. No. 4,632,408, is for a ski for handicapped people comprising a main ski and two outrigger members for assisting and controlling the movement of the sled and ski. There is a place for a person to sit and to control the direction of movement of the ski. The ski is manually operated. There is no servo means or no motor for propelling the ski and there is no remote control for the ski as the ski is manually controlled. Therefore, Olpp is not an anticipatory reference to the subject invention.

Capra, U.S. Pat. No. 4,796,902, is directed to a sled equipped with four skis, a frame, and a steering mechanism. Capra does not have a motor, is not remotely controlled, and does not have a propelling. Capra does comprise a manual steering column for directing the movement of the sled. Again, Capra is manually controlled and does not have a motor. Therefore, Capra is not anticipatory of the subject invention.

Melcher, U.S. Pat. No. 5,752,709, is directed to a linkage system for three skis on the sled. Melcher is a ski apparatus with two outer skis and a third ski located between the two outer skis coupled to the outer skis by four cranks connected as a front pair and a rear pair. Each crank has a gear on one end and a free end. The free end of a crank is attached to a journal box on an outer ski to permit the crank to rotate freely. Melcher does not have a motor for propelling the sled. Melcher does not have a servo mechanism for controlling the movement of the sled. The sled is manually controlled by an operator. Therefore, Melcher is not anticipatory of the present invention.

Gibbons, U.S. Pat. No. 6,116,622, is directed to a steerable and brakable sled. There are two skis, a place to place material to be transported, and a steering mechanism for the two skis. The sled is manually moved and manually controlled and does not have a motor and propelling means for moving the sled and does not have a remote control for controlling the movement of the sled. Therefore, Gibbons is not an anticipatory reference to the subject invention.

BRIEF SUMMARY OF THE INVENTION

The sled is a self-propelled mobile unit which can maneuver over different types of terrain such as snow, ice, earth, water and rocks.

The sled may carry rescue equipment such as a rope or a detector of electromagnetic waves from a transmitter.

The sled can also be used as a toy.

BRIEF DESCRIPTION OF THE SEVERAL VIEWS OF THE DRAWING(S)

FIG. 2 is a first side view of the sled equipped with skis and taken on line 2—2 of FIG. 1;

FIG. 3 is an opposite side view of the sled of FIG. 2 equipped with skis and taken on line 3—3 of FIG. 1;

FIG. 4 is a front elevational view of the sled taken on line 4—4 of FIG. 1 and illustrates the front middle ski;

FIG. 4A is an enlarged view of the connection of the sled to the ski;

FIG. 9A is a top plan view of the double hinge plate of the sled;

FIG. 9B is an outside end view of the double hinge plate of the sled;

FIG. 9C is an inside end view of the double hinge plate of the sled;

FIG. 9D is a front elevational view of the double hinge plate of the sled;

FIG. 10A is a front elevational view of the sled equipped with wheels and also illustrates in phantom line components of the sled;

FIG. 10B, on an enlarged scale, is a fragmentary front elevational view looking at the right front of the sled;

FIG. 10C is a fragmentary side elevational view of the front and middle wheels of the sled and the supporting structure;

FIG. 10D is a fragmentary side elvational view of the rear wheel and the supporting structure.

Figure 11:
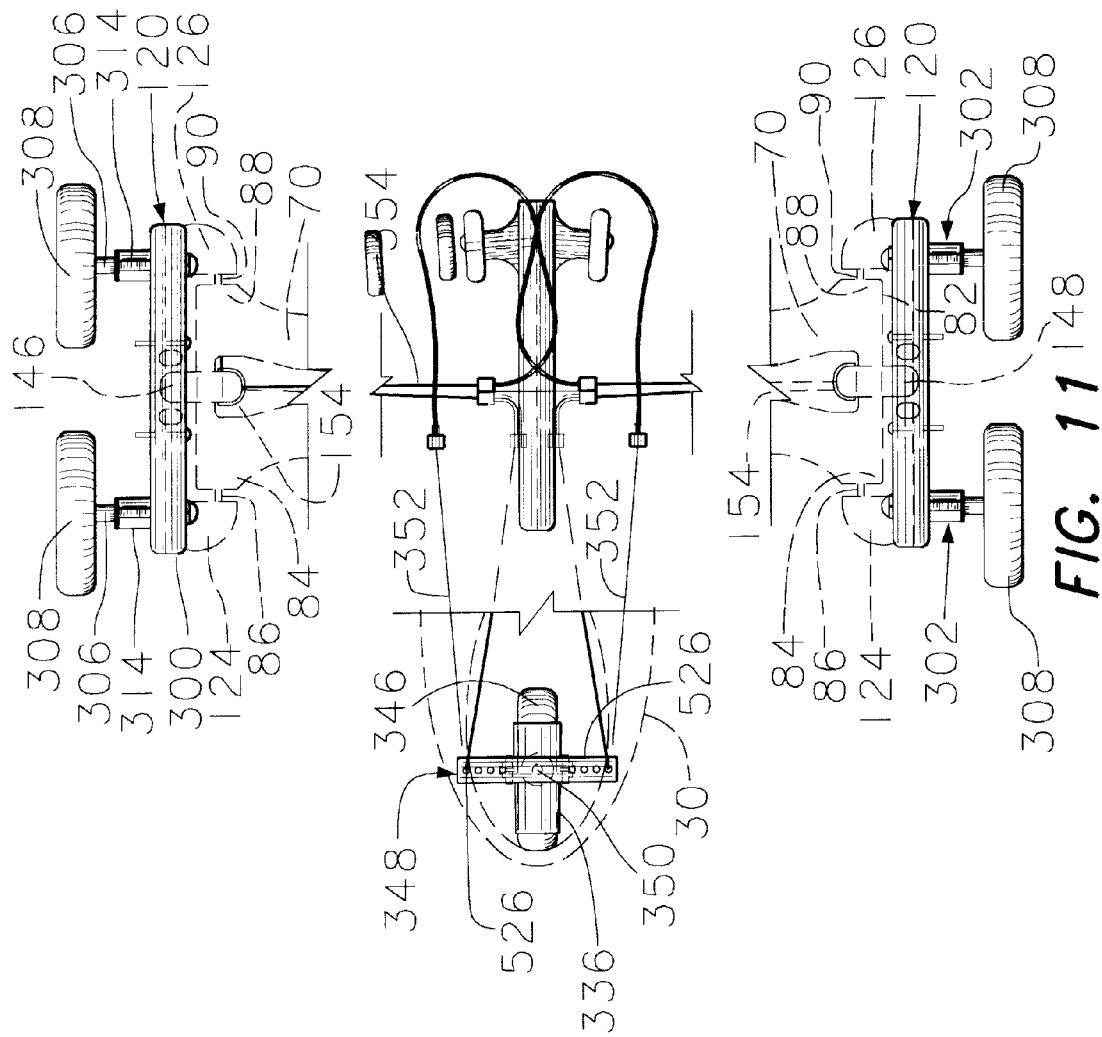
Figure 15:
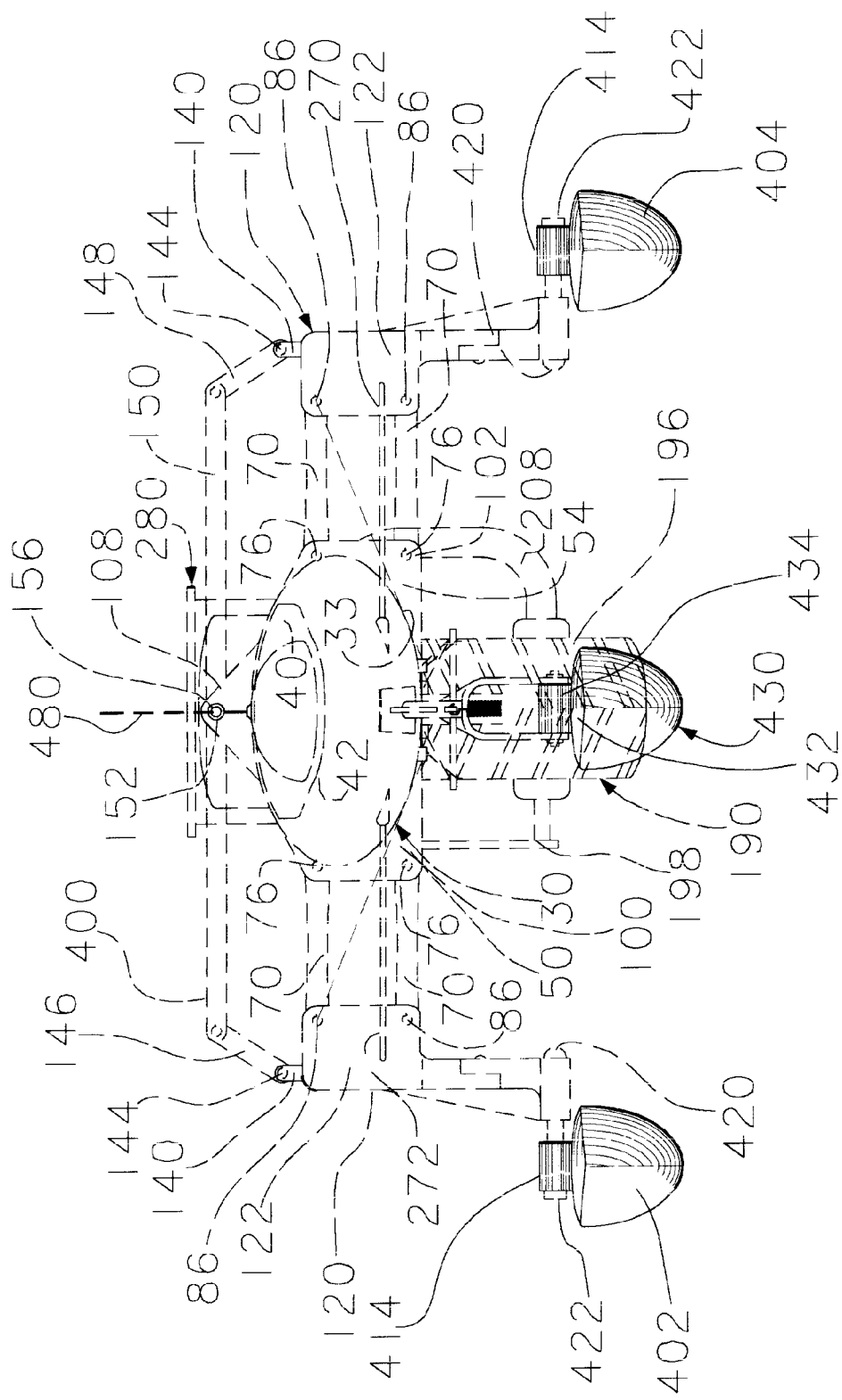
Figure 16:
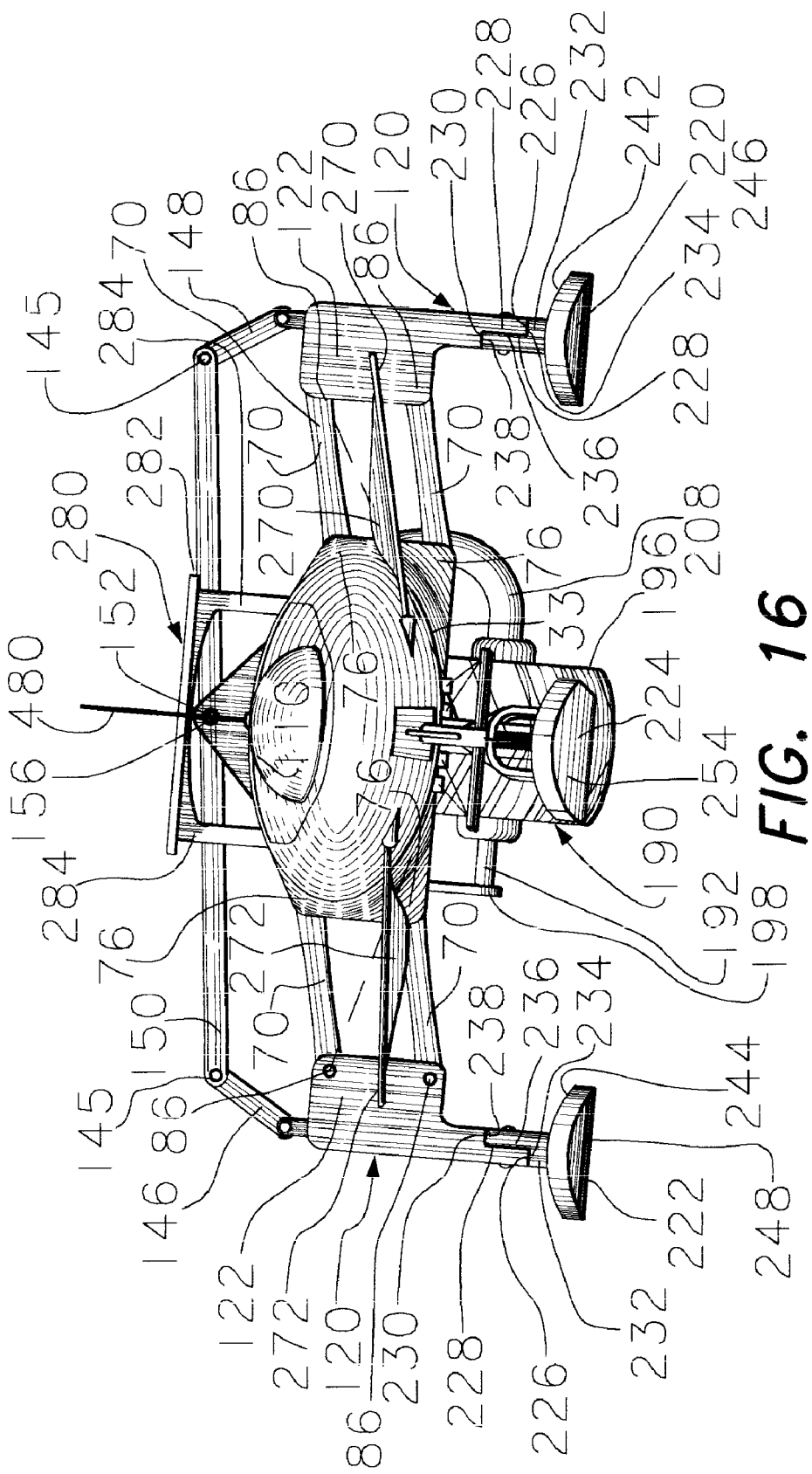
Figure 21:
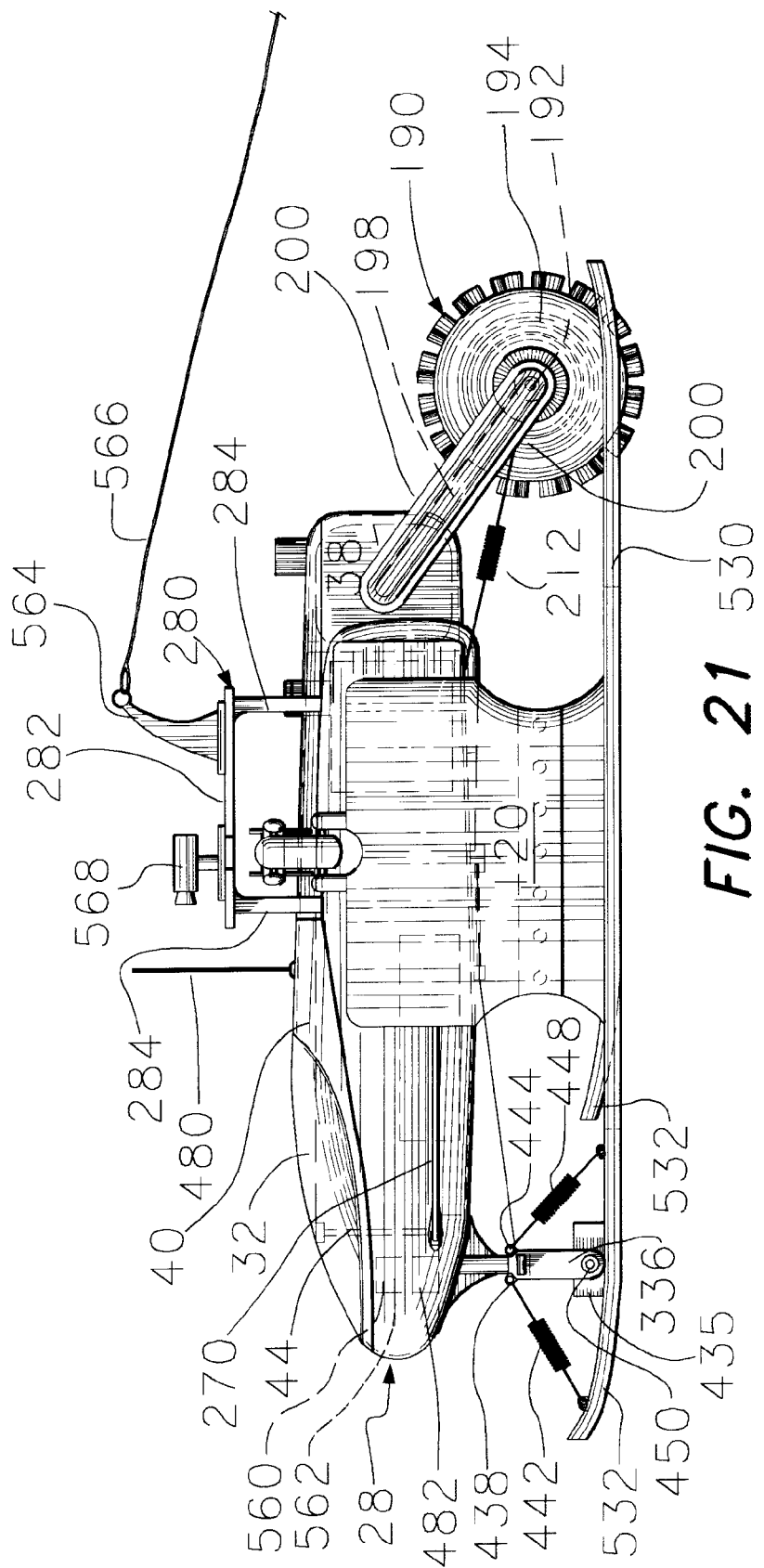

FIG. 11 is a fragmentary exploded top plan view of the sled with wheels;

FIG. 12A is a fragmentary view of one side of the sled with an endless cleated tracks;

FIG. 12B, partially in phantom line, is a front elevational of the sled with endless cleated tracks;

FIG. 12C is a fragmentary exploded top plan view of the sled with endless cleated tracks;

FIG. 13 is an exploded fragmentary top plan view of the sled equipped with pontoons;

FIG. 13A, on an enlarged scale, the supporting shaft for the ski connecting with the double hinge plate;

FIG. 14A is a fragmentary side elevational view of a pontoon on the front of the sled;

FIG. 14B is a fragmentary side elevational view of a pontoon and a propelling wheel for moving the sled;

FIG. 15 is a front elevational view, partially in phantom, of the sled with two outboard pontoons and a center pontoon;

FIG. 16 is a front elevational view of the sled equipped with skis and with the body tipped or slanted and with the skis at different elevations on a sloping terrain;

FIG. 17 is a fragmentary side elevational view of the sled and illustrates the two rear drive wheels for propelling the sled;

FIG. 17A is a fragmentary view of the chain connecting the two drive axles for propelling the sled;

FIG. 17B is a fragmentary view of an endless belt connecting the two drive axles for propelling the sled;

FIG. 18A is a fragmentary top plan view of another steering device for the front ski of the sled;

FIG. 18B is a fragmentary top plan view of another steering device for the front wheel on the sled;

FIG. 19A is a fragmentary bottom plan view of the sled with an alternate steering mechanism;

FIG. 19B is a fragmentary side elevational view of the sled with said alternate steering mechanism;

FIG. 20A is a fragmentary plan view of a combination of a double hinge bracket and a bracket for attaching to a ground engaging member of the sled such as a ski or a wheel or a pontoon;

FIG. 20B is a fragmentary side elevational view of the combination of the overhead pivotal tie bar and the double hinge bracket and said bracket for attaching to a ground engaging member of the sled such as a ski or a wheel or a pontoon; and FIG. 21 is a side elevational view of the sled equipped with skis, a drive wheel and a rope and electromagnetic sensing means.

DETAILED DESCRIPTION OF THE INVENTION

The subject matter is a mobile mechanical unit identified as a sled 28 which can move over various types of terrain. The sled 28 may be equipped with wheels. The sled 28 may be equipped with skis. The sled 28 may be equipped with pontoons. The sled 28 may be equipped with an endless track.

The sled 28 comprises a housing 30 for holding and containing various pieces of equipment. The housing 30 may be of metal such as s steel or aluminum. Also, the housing may be of plastic such as a unitary one piece molded plastic.

The sled has a top 32 which can be open and a lower part 33.

In the housing 30 there is a battery 34, a fuel tank 36, and an engine 38.

There is a cover 40 for the open top 32. In the cover 40 there is an opening 42. There is a canopy 44 for the opening 42.

There is a forward right bracket 50 and a rear right bracket 52. There is a forward left bracket 54 and a rear left bracket 56. There is a recess 58 between brackets 50 and 52. There is a recess 60 between brackets 54 and 56.

There is a double hinge bracket 70, see FIGS. 9A, 9B, and 20A. The double hinge bracket 70 has an open end 72 with a forward arm 74 and a pin 76 in the arm 74. There is a rearward arm 78 with a pin 80 in the arm 78. There is a closed end 82 having a forward edge 84 with a pin 86 in the edge 84. There is a rearward edge 88 with a pin 90 in the edge 88.

There is a recess 85 in forward edge 84 for receiving the pin 86. There is a recess 89 in rearward edge 88 for receiving the pin 90.

There is a weld 100 for welding the bracket 50 to the housing 30.

There is a weld 102 for welding the bracket 54 to the housing 30.

There is a weld 104 for welding the bracket 52 to the housing 30.

There is a weld 106 for welding the bracket 56 to the housing 30.

There is a weld 108 for welding the stabilizer plate at 110 to the housing 30.

Figure 7:
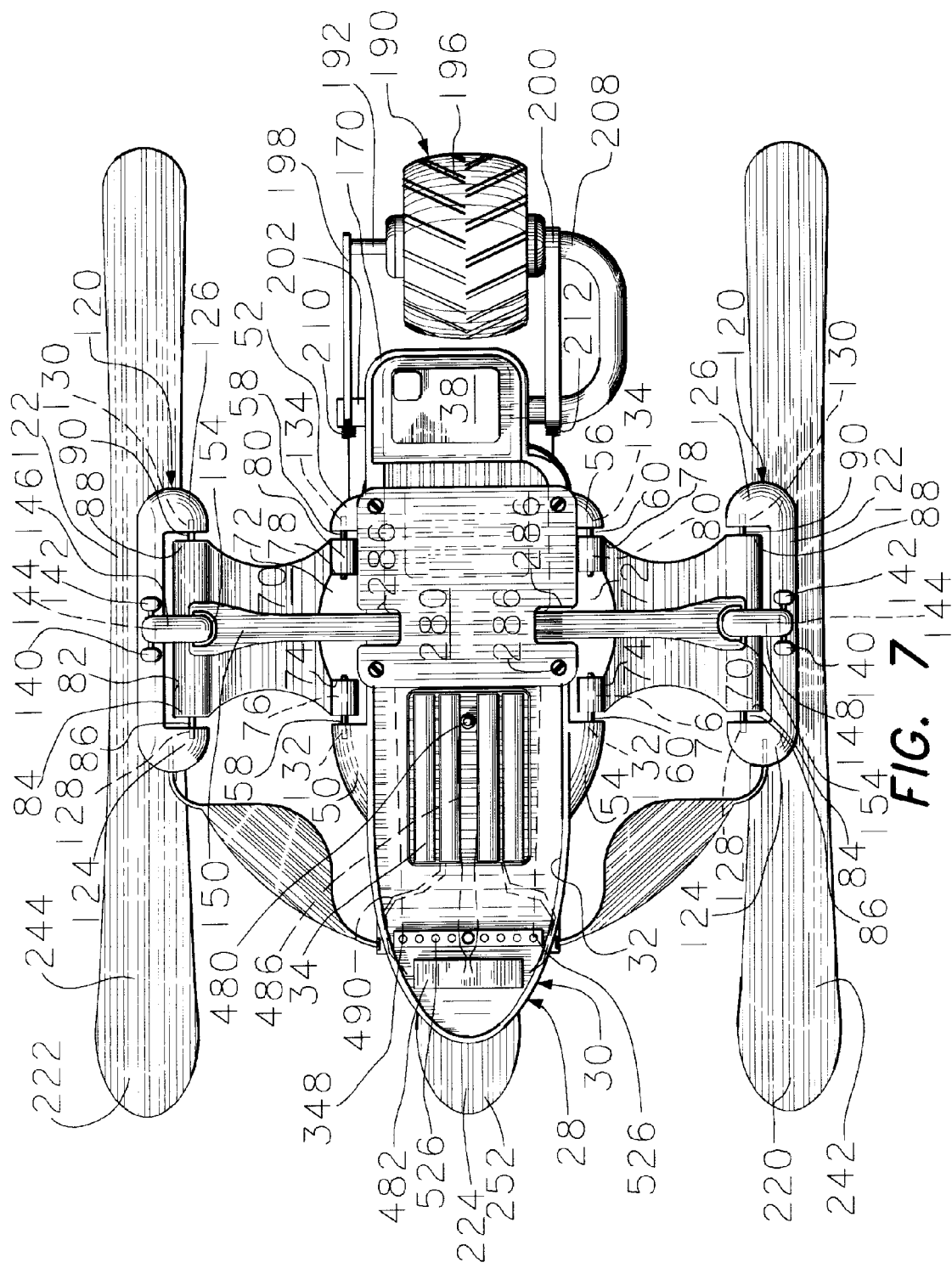
FIG. 7 is a top plan view of the sled equipped with skis and with part of the cover removed to illustrate various components of the sled such as a battery, steering bar, and engine.

With reference to FIG. 7 it is seen that there is a bracket for attaching to a ski. There is a support bracket 120 having a base 122, a first arm 124, and a second arm 126. There is a recess 128 in first arm 124 for receiving the pin 86. There is a recess 130 in second arm 126 for receiving the pin 90. There is a recess 132 in forward right bracket 50.

There is a recess 134 in right rear bracket 52 for receiving pin 80.

On support bracket 120 there is a forward post 140 and a rear post 142. There is a passageway 143 in double hinge bracket 148. There is a shaft 144 in passageway 143 between forward post 140 and rear post 142.

There is a right double hinge bracket intermediary tie 146 and a left double hinge 148.

There is an overhead pivotal bar 150. In the stabilizer plates 108 there are passageways 152. There is a passageway 154 in the tie bar 150. There is a pin or shaft 156 connecting 152 and 154.

A pin 145 connects hinge 148 and pivotal bar 150.

Par of the housing 30 is identified as housing 170 for the engine 38. 170 is adjacent to the engine 38. The housing 30 has a bottom, sides, and provision for an open top for ease of accessibility to the components in the housing.

There is a drive wheel 190 comprising an axle 192, a rim 194, a tire 196, and a first pivoting axle 198 arm and a second pivoting axle arm 200. There is a hub 202 on 170. There is a housing 208 for the cable drive connecting the engine 38 and the wheel 190. There is a first tension spring 210 and a second tension spring 212.

With respect to FIGS. 1–8 and the sled 28 it is seen that there is a left ski 220, a right ski 222, and a center ski 224. It is necessary to connect the skis to the body of the sled 28. There is a support bracket 120 connecting with the housing 30 of the sled 28.

On the lower part of the support bracket there is a lower forward horizontal edge 226, a vertical edge 228, and an upper horizontal edge 230. On the upper surface of the ski there is an attaching bracket 232 having a lower horizontal edge 234, a vertical edge 236, and an upper horizontal edge 238.

230 and 238 are adjacent to each other. 228 and 236 are adjacent to each other. 226 and 234 are adjacent to each other.

The ski 220 has an upper surface 242. The ski 222 has an upper surface 244. The ski 220 has a running surface 246. The ski 222 has a running surface 248. The center ski 224 has an upper surface 252. The center ski 224 has a running surface 254. There is a connecting bracket 256 to the lower part of the sled 28 and the upper surface 252 of the center ski 224.

There is a passageway 260 in 232. There is a passageway 262 in support bracket 120. The passageways 260 and 262 are aligned. There is a bolt 264 in passageways 260 and 262 to connect together the attaching bracket 232 and the upper surface of the ski and a connecting bracket 120 on the lower part of the sled 28. There is a nut 266 on the bolt 264.

There is a left air foil 270 on the lower left front part of the housing. There is a right air foil 272 on the lower right front part of the housing of the sled 28.

On the upper part of the sled and the housing 30 there is an equipment platform 280. Platform 280 has an upper flat surface 282 and four spaced-apart supports and attaching legs 284.

There are screws 286 attaching the upper flat member to the legs 284. There are two spaced-apart recesses 288 in the upper flat member 282 to accommodate the tie bar 150.

In FIGS. 10A, 10B, 10C, 10D, and 11 there is illustrated a sled 300. The sled 300 is similar to the sled 28. Sled 300 has wheels while the sled 28 has skis. Where there is commonalty of parts the same reference numerals will be used for sleds 28 and 300. There is a bracket 120 associated with the housing 30 of the sled 300. The lower part of the bracket 120 has a lower horizontal edge 226, a vertical edge 228, and an upper horizontal edge 230. The wheel part of the sled 300 comprises an axle housing 302 with a passageway 304. There is an axle 306 in the passageway 304. There is a wheel 308 on the axle 306. A gusset 310 connects with the axle housing 302. There is a lock nut 312 on the axle 306. The surfaces 230 and 238 are adjacent to each other. The surfaces 228 and 236 are adjacent to each other. The surfaces 234 and 226 are adjacent to each other. The reference numeral 314 is assigned to the assembly of the parts 260, 264, 236, 238, 302, 304, 306, 308, and 310. There is a weld 316 connecting the gusset 310 and with the axle components. There is a passageway 260 in the assembly 314. There is a passageway 262 in the bracket 120. The passageways 260 and 262 are aligned for receiving a bolt 264. There is a nut 266 on the bolt 264 for joining the assembly 314 to the bracket 120.

In FIG. 10C it is seen that there is an upper tie bar 320 and a lower tie bar 322 for giving rigidity to the wheels 308 on the axles 306.

On the lower front part of the housing 30 or the lower front part 33 is mounted a mounting plate 332. There is a vertical connecting rod 334 connecting with the mounting plate 332. There is a fork 336 attached to the connecting rod 334. The fork 336 has a first arm 338 and a second arm 340 giving the appearance of a U-configuration. An axle 342 is positioned between the first arm 338 and the second arm 340. There is mounted on the axle 342 the wheel 346. On the upper part of the fork 336 there is attached a steering bar 348. The steering bar is mounted on a pivot 350 which is attached to the vertical connecting rod 334. It is possible to move the fork 336 and the wheel 36 for guiding and directing the path of movement of the sled 300.

With respect to FIG. 11 it is seen that there is a right steering cable 352 connecting with the steering bar 348 and, also, with the right double hinge bracket 146. There is a left steering cable 354 connecting with the steering bar 348 and the left double hinge bracket 148.

With respect to FIGS. 12A, 12B, and 12C there is a sled 357. The sled 357 is similar to the sled 28 and to the sled 300. Where there is commonality of parts the same reference numerals will be used. The sled 357 differs from the sled 28 in that there is an endless track on the sled 357 as contrasted with skis on the sled 28. The sled 357 differs from the sled 300 as there is an endless track on the sled 357 as contrasted with wheels on the sled 300. On the lower forward part 33 of the sled 357 there is a mounting plate 332. A connecting rod 334 connects with 332. A fork 336 connects with the vertical connecting rod 334 in a manner similar to that for sled 300. A fork 336 is mounted on the rod 334. The fork 336 comprises a first arm 338 and a second arm 340 in a spaced-apart configuration resembling a U-configuration.

There is a triangular axle plate 360 mounted on the mounting shaft 362 on the fork 336. The triangular axle plate 360 carries the rear axle 364 and a forward axle 366. There is a rear disk 368 and a forward disk 370. The rear disk 368 is mounted on the rear axle 364 and the forward disk 370 is mounted on the forward axle 366. There is an endless or circular track 372 encircling the rear wheel 368 and the forward wheel 370.

There is an assembly 314 attached to the underside of the sled 357. The assembly comprises the structure as illustrated in FIGS. 10C and 12A. There may be mounted on wheels 304 or disks 308 an endless track 374.

There is a drive wheel 382 or a drive disk 382 corresponding to the drive wheel 190, see FIGS. 2 and 3.

There is an axle 388 on which there is an idler wheel or sprocket 390. An endless track 392 wraps around the drive wheel 382 and the idler wheel 390.

There is a support arm 394 for spacing apart disks 382 and 390 and for receiving and for positioning axles 192 and 388.

With respect to FIGS. 13, 13A, 14A, 14B, and 15 there is shown a sled 400 with pontoons. The basic structure of the sled 400 is similar to the sleds 28, 300, and 357. Where there is commonality of parts the same reference numerals will be used. There is a right pontoon 402 and a left pontoon 404. There is a passageway 406 in support bracket 120. There is an axle housing 408 in passageway 406. There is a passageway 410 in axle housing 408. There is an axle 412 in the axle housing. There is a connecting bracket 414 connecting with the upper surface 416 of pontoon 402. Also, there is a connecting bracket 414 connecting with the upper surface 424 of the pontoon 404. There is a passageway 418 in bracket 414. The axle 412 has an inside edge 420. The axle 412 has an outside edge 422.

There is a center and front pontoon 430 having an upper surface 432. There is a connecting bracket 434 connecting to the upper surface 432. There is a connecting rod 334 connecting to the underneath front part 33 of the housing 30. There is an attaching bracket 436 connecting to the housing 30. There is a connecting means 434 on the upper surface 432. A spring 442 connects with eyelet 438 on 436 and 440 on 432. There is an eyelet 444 on 436. There is a connecting means 446 on 430. There is a spring 448 connecting with 444 and with 446. The springs 442 and 448 are to maintain tension on the center pontoon and to bring it to a neutral position against wave and motion forces. In place of the springs 442 and 448 there can be used bungi cords.

The structure between attaching bracket 436 on the housing 30 is similar to the structure to the mounting plate 332, see FIG. 10A and 12B, and the vertical connecting rod 334. There is a fork 336 mounted on the vertical connecting rod 334 having a first arm 338 and a second arm 340 in a spaced-apart relationship to give a U-configuration. There is a mounting shaft 450 between the two arms 338 and 340 and positioned in bracket 434. The center pontoon 430 can rotate around the horizontal mounting shaft 450 with respect to the arms 338 and 340. This gives some leeway for center pontoon 430 to vertically rotate with respect to wave action and wind action driving the water. There is a steering bar 348 having passageways 526. Also, there is the right steering cable 352 and the left steering cable 354. There is the right steering cable 352 connecting to right double hinge bracket 70. There is the left steering cable 354 connecting to left double hinge bracket 70. From this it is seen that the movement of the steering bar moves the center pontoon 430 horizontally for steering the sled 400 in the water.

With respect to FIGS. 13, 14A, 14B and 15 it is seen that the center pontoon 430 is of a shorter length than the right pontoon 402 and the left pontoon 404. A front view, see FIG. 15, shows the pontoon to be of a generally parabolic configuration. Each of the pontoons has a tapered bow and a square stern.

With respect to FIG. 16 it is seen that there are aerofoils 270 and 272. The airfoil 270 is a left airfoil. The airfoil 272 is a right airfoil.

In FIG. 16 it is seen that the left ski 220 is at a higher elevation than the right ski 222. The center ski 224 is at an elevation between the elevation of ski 220 and the elevation of ski 222. The sled can be on the side of a hill or a slope of a hill and still function because of the overhead pivotal tie bar 150; the right intermediary tie 146; the left intermediary tie 148; and the double hinge brackets 70. This ability of the sled to accommodate to a slope or a different elevation for the skis 220, 222, and 224 is of value as it lessens the possibility of the sled overturning on the slope or the side of a hill.

The remarks with respect to the sled 28 and the skis being at different elevations also apply to the sled 300 with wheels 346 and also to the sled 357 with the endless circular tracks 372 and 374.

In FIG. 17 there is a fragmentary view of the sled having substantially the basic structure of the sleds 28, 300, 357, and 400.

In FIG. 17A there is a housing 460 for supporting and positioning the shaft 192 and the sprocket 461 on the shaft 192 and for positioning the shaft 462 and the sprocket 464 on the shaft 462. A chain 466 runs around the two sprockets 461 and 464. There is a cover 468 for covering the sprockets and the chain. There is a rim 470 mounted on the shaft 462. There is a tire 472 on the rim 470. In FIG. 17B there is a pulley 474 on the shaft 192 and a pulley 476 on the shaft 462. A belt 478 runs around the pulleys 474 and 476. There is a cover 468 for covering the pulley 474 and 476 and the belt 478.

With respect to FIGS. 1, 2, 3, 4, 5, 7, 8, 10A, 15, 16, and 17 it is seen that there is an antenna 480 connecting with a servomotor 482. There is a lead wire 486 between the antenna 480 and the servomotor 482. There is a wire 490 connecting battery 34 to the servomotor 482.

Figure 1:
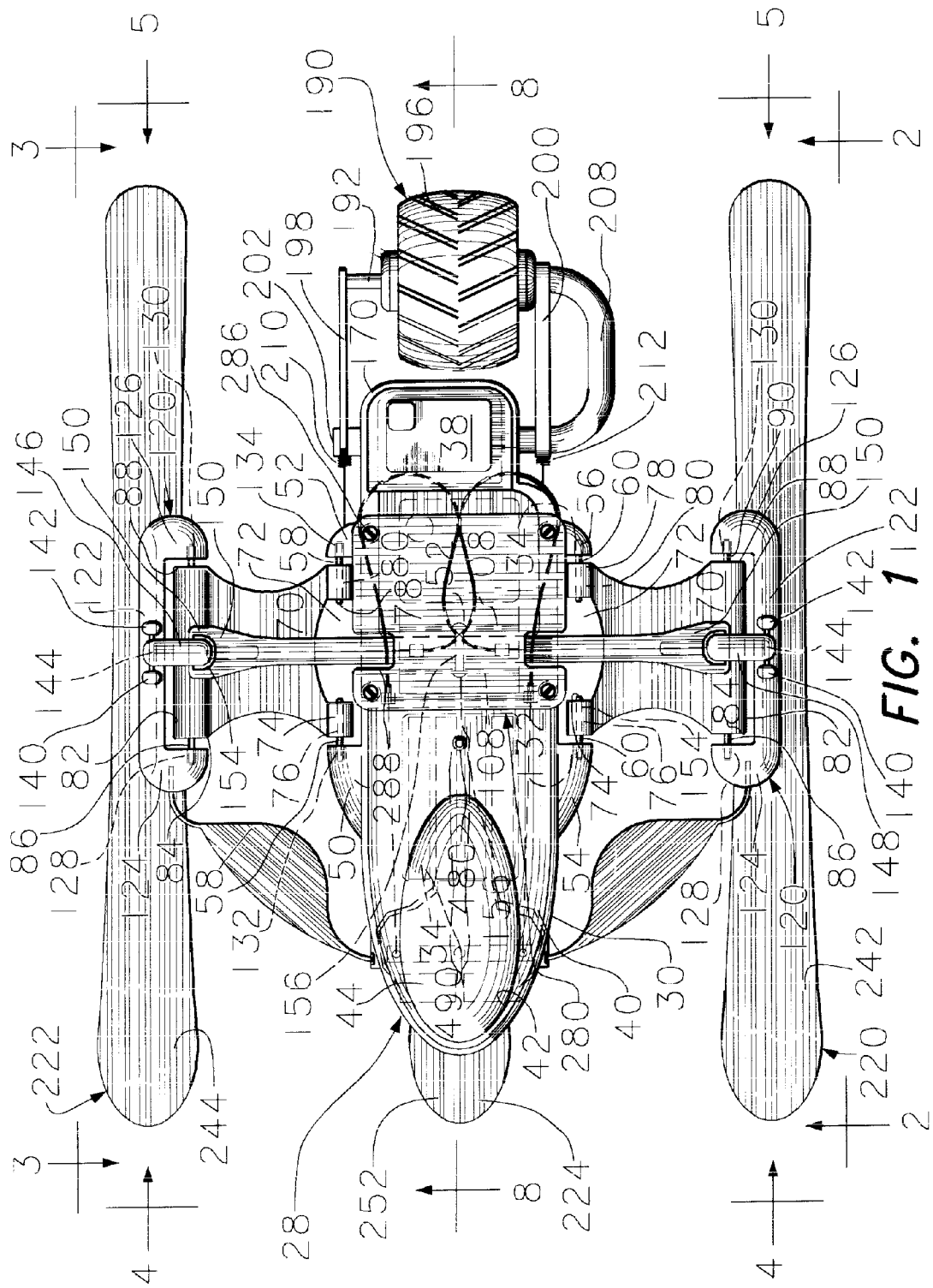
FIG. 1 is a top plan view of the sled equipped with skis.
Figure 5:
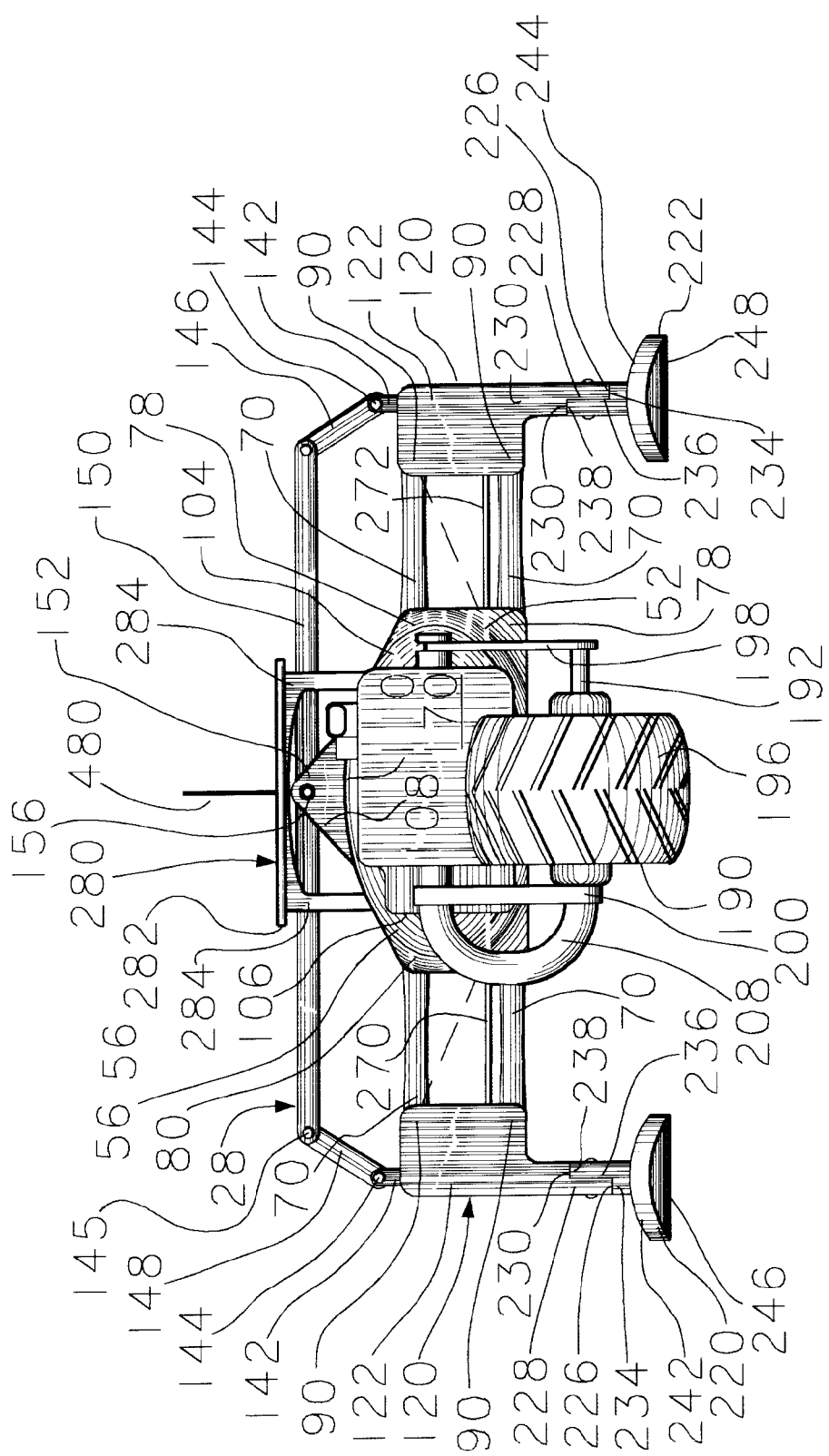
FIG. 5 is a rear elevational view of the sled taken on line 5—5 of FIG. 1 and illustrates the tire propelling means for moving the sled.
Figure 6:
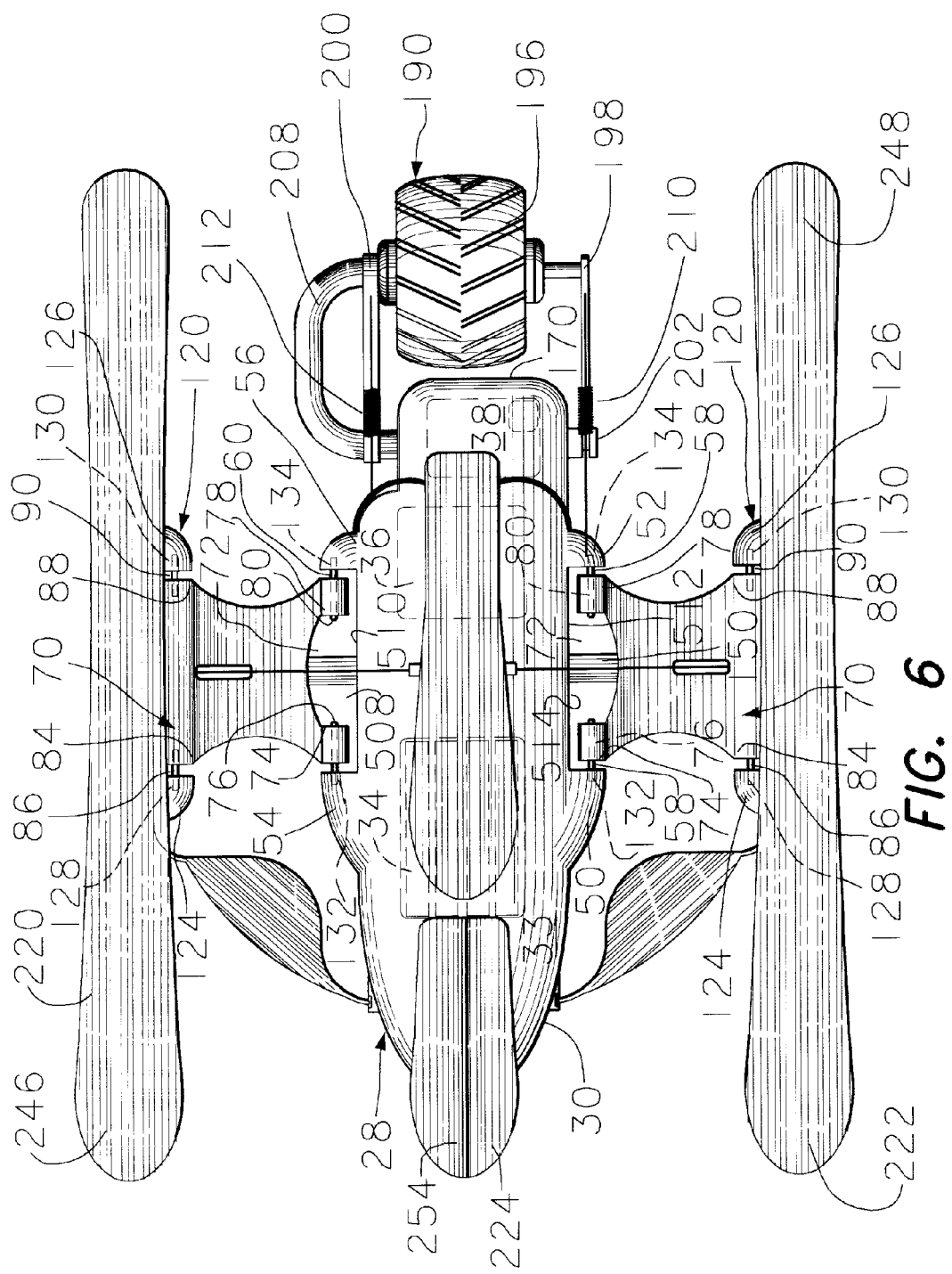
FIG. 6 is a bottom plan view of the sled equipped skis and shows the outer skis and then the inner central ski.

With respect to FIG. 6 it is seen that there is a left recess 508 in housing 30 between brackets 54 and 56. The housing 30 has an edge 510 adjacent to recess 508. There is a right recess 512 in housing 30 between brackets 50 and 52. Adjacent the right recess 512 is an edge 514.

In FIGS. 11 and 19A it is seen that there is a support rod 516 positioned between edge 510 and edge 514. On the rod 516 there is a right connector 520 and a left connector 518. There is a right flexible sheathing 522 and a left flexible sheathing 524. The right steering cable 354 is in the right flexible sheathing 522. The left steering cable 352 is in the left flexible sheathing 524. In the steering bar 348 there are holes or passageways 526. The right steering cable 354 and the left steering cable 352 connect with the holes 526 in the steering bar 348. The right steering cable 354 and the left steering cable 352 connect with the appropriate holes or passageways 526 in the steering bar 348. The right steering cable 354 connects with the right double hinge bracket 146. The left steering cable 352 connects with the left double hinge bracket 148.

In FIG. 18A there is illustrated a variation for steering the sled 28 with the ski. It is seen that there is a short central ski 530 having a fitted pin connecting 534 with a rotatable short ski 532. The right steering cable 354 connects with the short rotatable or short steering ski 532. The right steering cable 354 connects with the steering bar 348 and the left steering cable 352 connects with the steering bar 348. By controlling the steering cables 352 and 354 it is possible to control the rotation and direction of movement of the short ski 352 and also the direction of movement of the sled 28.

In FIG. 18B there is a fragmentary presentation of the steering apparatus comprising a wheel 542. There is the short central ski 530 and the fitted pin 534 connecting 530 with the support structure 540 for the wheel 542. There is a steering bar 348. There is a left steering cable 352 and a right steering cable 354 connecting with the holes or passageways 526 in the steering bar 348. With the control of the steering cables 352 and 354 it is possible to rotate the wheel in the desired direction. The support structure for the wheel 542 comprises a U-shaped configuration 539 comprising a first leg 543 and a second leg 544. There is an axle 546 positioned on the first leg 544 and the second leg 543. The wheel 542 is positioned on the axle 546.

In FIGS. 19A and 19B there is illustrated another steering apparatus comprising a rudder 550 mounted on a steering rod 552. There is a lower bearing 554 and an upper bearing 556 for the rod 552. The lower bearing 554 is mounted on the center ski 224. The upper bearing 556 is mounted on the housing 30. There is a steering bar 548 having holes or passageways 526 connecting with the steering rod 552. The left steering cable 352 connects with the steering bar 348. The right steering cable 354 connects with the steering bar 348. It is seen that there is a left connector 518 and a right connector 520 for assisting the steering cables 352 and 354.

From the foregoing it is seen that there has been provided various sleds with different terrain engaging members such as a ski, a wheel, an endless track, and a pontoon. In FIGS. 1–8 there is the sled 28 having skis 220, 222, and 224. There is a propelling means such as a tire 196. The tire can engage the terrain such as dirt, asphalt, concrete, snow, and water to propel the sled in a forward or rearward direction as desired.

In FIGS. 10A, 10B, and 11 there is illustrated a sled 300 having ground engaging or terrain engaging members such tires 308 and 346. The propelling means can be the tire 196 as illustrated in FIGS. 1–8.

In FIGS. 12A, 12B, and 12C there is illustrated a sled 357 having as a ground engaging means endless tracks such as 372, 374, and 392. The terrain engaging means and propelling means can be the endless track 392. The track 392 can operate on various terrain such as ground, asphalt, concrete, water, snow, and ice.

In FIGS. 13, 13A, 14A, 14B, and 15 there is illustrated the sled 400 having the pontoons 402, 404, and 430. There is the tire 196 which can be used with a terrain engaging means such as water. It is conceivable that the sled 400 can be used in snow because of the pontoons. The tire 196 is the propelling means.

In FIG. 17 there is illustrated a sled 459 which is a variation of the sled 357 of FIGS. 12A, 12B, and 12C. The endless track 392 is replaced with two tires 196 and 472. 196 has been used with the sled 28. A drive chain is connected to the tire 472 so that there are two terrain engaging means for propelling the sled 459. The two terrain engaging means are the tires 196 and 472 as illustrated in FIG. 17.

Figure 8:
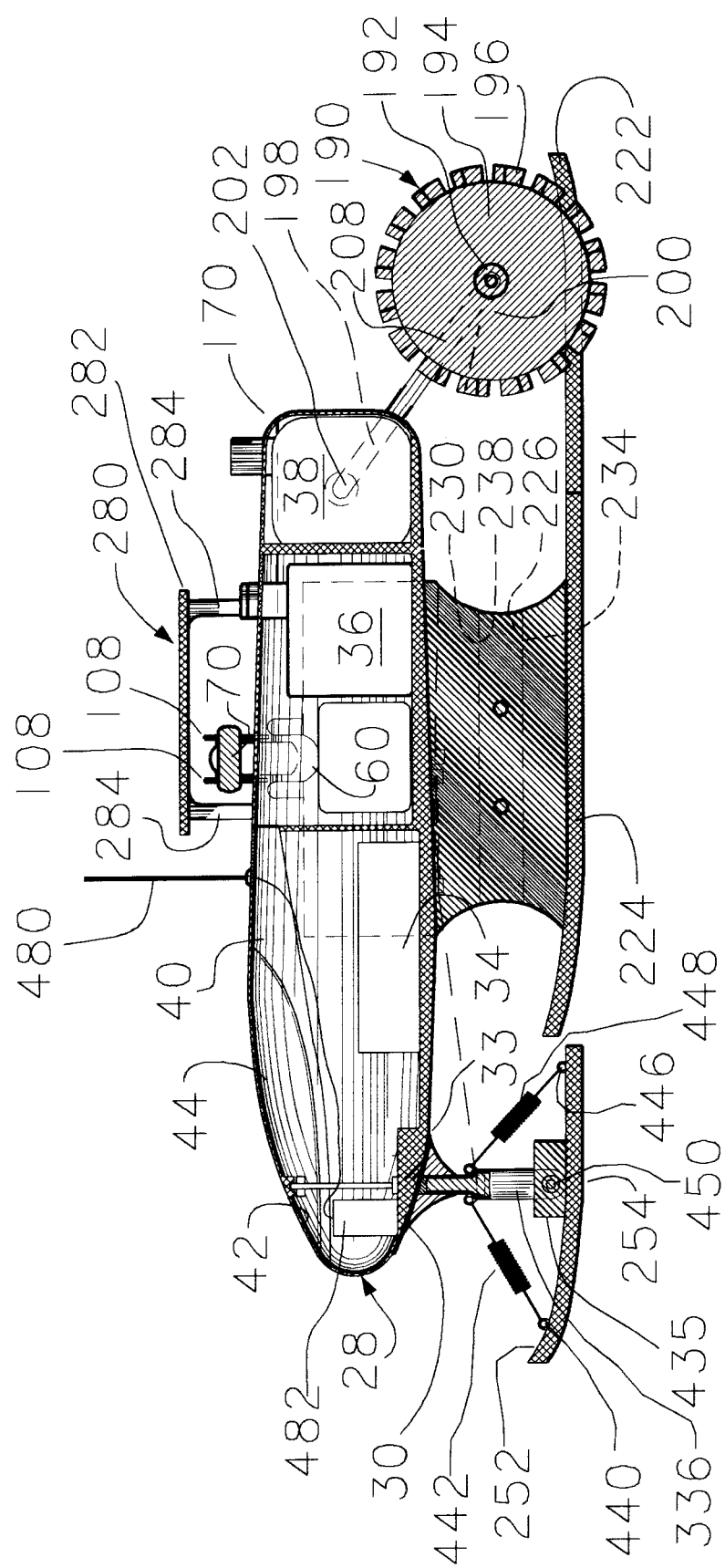
FIG. 8 is a longitudinal cross-sectional view of the sled taken on line 8—8 of FIG. 1 and illustrates the central ski and the forward steering ski of the sled.

In FIG. 21 there is illustrated a sled 28 similar to the sled 28 of FIG. 8. It is seen that there are two wires, 560 and 562, connecting with the servomotor 482. An operator may be at a considerable distance from the sled 28 and by means of the wires 560 and 562 the operator can manipulate and maneuver the sled 28 over different types of terrain such as snow, ice, land, water, and the like.

There is the equipment platform 280 having an upper flat surface. An attaching means 564 connects with the upper flat surface 282 of the equipment platform 280. A rope 566 may connect with the attaching means 564. The sled 28 can be of a relatively light weight and maneuvered over ice or on a body of water. If a party has broken through the ice and fallen in the water the operator of the sled 28 can maneuver the sled close to the person in the water so that the rope 566 is close to the person in the water. Then, the person in the water can grab the rope 566 and by means of the sled or by manual means or the rope being attached to a movable means such as a tractor or an automobile the person can be pulled from the water. In this regard the sled 28 can be a rescue unit for positioning a rope near a person in the water so that the person in the water can be pulled out of the water.

It is seen that there is a symbolic electronic member 568 on the Supper flat surface 282 of the equipment platform 280. The symbolic electronic member 568 can be a rotatable television camera and transmitter or can be a detector for a person buried in an avalanche.

The rotatable television camera and transmitter can be used for entrance into an inaccessible and, possibly, dangerous places. The television camera can transmit the signal to a more conveniently located place. Assume that a person has been buried in an avalanche. Assume that the person has a transmitter of electromagnetic waves on the person's body. If the symbolic electronic member 568 can receive electromagnetic signals from the person buried in the avalanche it is possible to, quickly, locate the person buried in the avalanche. In this regard the sled 28 can be used as a rescue vehicle for trying to extricate the person buried in the avalanche. There is considerable saving in time as the person in the avalanche has the electromagnetic signal transmitter and the sled 28 has the electromagnetic signal receiver 568. With this arrangement it may be possible to rescue the person buried in the avalanche.

Also, the sled 28 may be used for exploring in difficult to reach or undesirable places. Or, explosives can be placed on the sled 28 and maneuvered by means of the antenna 480 or maneuvered by means of the wires 560 and 562 to the desired location. Then, the explosives on the sled 28 can be exploded as desired. In such a situation the safety of an individual is not risked.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; and said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a housing operatively connecting with said stabilizer plate; a motor operatively connecting with said housing; a propelling means for propelling said mechanical unit; and said motor and said propelling means operatively connecting and with said motor driving said propelling means to move said mechanical unit.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a steering bar rotatably positioned on said middle support; and said steering bar operatively connecting with said third ground engaging means.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a steering bar rotatably positioned on said middle support; said steering bar operatively connecting with said third ground engaging means; and a servo motor operatively connecting with said steering bar for rotating said steering bar and said third ground engaging means for steering said mechanical unit.

A mobile mechanical unit comprising a first bracket; a stabilizer plate operatively connecting with said first bracket; a first right double hinge bracket,operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a steering bar rotatably positioned on said middle support; said steering bar operatively connecting with said third ground engaging means; a servo motor operatively connecting with said steering bar for rotating said steering bar and said third ground engaging means for steering said mechanical unit; and a source of electrical energy operatively connecting with said servo motor.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a steering bar rotatably positioned on said middle support; said steering bar operatively connecting with said third ground engaging means; a servo motor operatively connecting with said steering bar for rotating said steering bar and said third ground engaging means for steering said mechanical unit; a source of electrical energy operatively connecting with said servo motor; and said source of electricity being remotely positioned with respect to said servo motor.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a steering bar rotatably positioned on said middle support; said steering bar operatively connecting with said third ground engaging means; a servo motor operatively connecting with said steering bar for rotating said steering bar and said third ground engaging means for steering said mechanical unit; a source of electrical energy operatively connecting with said servo motor; said source of electricity being an electrical battery positioned on said mechanical unit and operatively connecting with said servo motor; an antenna on said mechanical unit for receiving electromagnetic signals for controlling the operation of the servo motor and operatively connecting with said servo motor.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left a double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and an electromagnetic sensing means on said mechanical unit for sensing electromagnetic waves and for indicating that said electromagnetic waves have been sensed.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and a rope operatively connecting with said mechanical unit for a rescue purpose.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and said first ground engaging means, said second ground engaging means, and said third ground engaging means being skis.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; said first ground engaging means, said second ground engaging means, and said third ground engaging means being skis; and a tensioning means operatively connecting with said middle support and with said third ground engaging means, said ski.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; said first ground engaging means, said second ground engaging means, and said third ground engaging means being skis; a tensioning means operatively connecting with said middle support and with said third ground engaging means, said ski; said tensioning means comprising a first spring connecting with said middle support and with said ski forwardly of said middle support; and a second spring connecting with said middle support and with said ski aft of said middle support.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and said first ground engaging means, said second ground engaging means, and said third ground engaging means being wheels.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; said first ground engaging means, said second ground engaging means, and said third ground engaging means being wheels; said first ground engaging means being a first assembly comprising two spaced apart wheels; said first assembly operatively connecting with said housing; said second ground engaging means being a second assembly comprising two spaced apart wheels; said second assembly operatively connecting with said housing; and said first assembly and said second assembly being spaced apart.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and said first ground engaging means, said second ground engaging means, and said third ground engaging means being endless tracks.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; said first ground engaging means, said second ground engaging means, and said third ground engaging means being endless tracks; and a tensioning means operatively connecting with said middle support and with said third ground engaging means, said endless track.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; said first ground engaging means, said second ground engaging means, and said third ground engaging means being endless tracks; a tensioning means operatively connecting with said middle support and with said third ground engaging means, said endless track; said tensioning means comprising a first spring connecting with said middle support and with said third ground engaging means forwardly of said middle support; and a second spring connecting with said middle support and with said third ground engaging means aft of said middle support.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; said first ground engaging means, said second ground engaging means, and said third ground engaging means being skis; a tensioning means operatively connecting with said middle support and with said third ground engaging means, said ski; said first ground engaging means being a first assembly comprising two spaced apart discs with a track running around said discs; said first assembly operatively connecting with said housing; said second ground engaging means being a second assembly comprising two spaced apart discs with a track running around said discs; said second assembly operatively connecting with said housing; said first assembly and said second assembly being spaced apart; said third ground engaging means being a third assembly comprising two spaced apart discs with a track running around said two spaced apart discs; and said third assembly being positioned forwardly of said first assembly and said second assembly and operatively connecting with said housing.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and said first ground engaging means, said second ground engaging means, and said third ground engaging means being pontoons.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; said first ground engaging means, said second ground engaging means, and said third ground engaging means being pontoons; said tensioning means comprising a first spring connecting with said middle support and with said pontoon forwardly of said middle support; and a second spring connecting with said middle support and with said pontoon aft of said middle support.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; said first ground engaging means, said second ground engaging means, and said third ground engaging means being skis; said first ground engaging means, said second ground engaging means, and being spaced apart; said third ground engaging means being between said first ground engaging means and said second ground engaging means; a pivot pin on said third ground engaging means; and a fourth ski mounted on said pivot pin and being capable of rotating on said pivot pin to direct the direction of movement of said mechanical unit.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; said first ground engaging means, said second ground engaging means, and said third ground engaging means being skis; said first ground engaging means, said second ground engaging means, and being spaced apart; said third ground engaging means being between said first ground engaging means and said second ground engaging means; a pivot pin on said third ground engaging means; a fourth ski mounted on said pivot pin and being capable of rotating on said pivot pin to direct the direction of movement of said mechanical unit; said first ground engaging means, said second ground engaging means, and said third ground engaging means being skis; said first ground engaging means, said second ground engaging means, and being spaced apart; said third ground engaging means being between said first ground engaging means and said second ground engaging means; a pivot pin on said third ground engaging means; and a wheel assembly mounted on said pivot pin and being capable of rotating on said pivot pin to direct the direction of movement of said unit.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a housing operatively connecting with said stabilizer plate; a motor operatively connecting with said housing; a propelling means for propelling said mechanical unit; said motor and said propelling means operatively connecting and with said motor driving said propelling means to move said mechanical unit; a first pivoting axle arm operatively connecting with said housing; a second pivoting axle arm operatively connecting with said housing; a first axle mounted on said first pivoting axle arm and on second pivoting axle arm; a first rotatable disc mounted on said first axle; and a cable drive connecting said motor and said first rotatable disc for rotating said first rotatable disc.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a housing operatively connecting with said stabilizer plate; a motor operatively connecting with said housing; a propelling means for propelling said mechanical unit; said motor and said propelling means operatively connecting and with said motor driving said propelling means to move said mechanical unit; a first pivoting axle arm operatively connecting with said housing; a second pivoting axle arm operatively connecting with said housing; a first axle mounted on said first pivoting axle arm and on second pivoting axle arm; a first rotatable disc mounted on said first axle; a cable drive connecting said motor and said first rotatable disc for rotating said first rotatable disc; a first tensioning means operatively connecting with said first pivoting axle arm and said unit; and a second tensioning means operatively connecting with said second pivoting axle arm and said unit.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a housing operatively connecting with said stabilizer plate; a motor operatively connecting with said housing; a propelling means for propelling said mechanical unit; said motor and said propelling means operatively connecting and with said motor driving said propelling means to move said mechanical unit; a first pivoting axle arm operatively connecting with said housing; a second pivoting axle arm operatively connecting with said housing; a first axle mounted on said first pivoting axle arm and on second pivoting axle arm; a first rotatable disc mounted on said first axle; a cable drive connecting said motor and said first rotatable disc for rotating said first rotatable disc; a first tensioning means operatively connecting with said first pivoting axle arm and said unit; a second tensioning means operatively connecting with said second pivoting axle arm and said unit; said first tensioning means being a spring; and said second tensioning means being a spring.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a housing operatively connecting with said stabilizer plate; a motor operatively connecting with said housing; a propelling means for propelling said mechanical unit; said motor and said propelling means operatively connecting and with said motor driving said propelling means to move said mechanical unit; a first pivoting axle arm operatively connecting with said housing; a second pivoting axle arm operatively connecting with said housing; a first axle mounted on said first pivoting axle arm and on second pivoting axle arm; a first rotatable disc mounted on said first axle; a cable drive connecting said motor and said first rotatable disc for rotating said first rotatable disc; and said rotatable disc having a uneven peripheral surface for traction purposes.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a housing operatively connecting with said stabilizer plate; a motor operatively connecting with said housing; a propelling means for propelling said mechanical unit; said motor and said propelling means operatively connecting and with said motor driving said propelling means to move said mechanical unit; a first pivoting axle arm operatively connecting with said housing; a second pivoting axle arm operatively connecting with said housing; a first axle mounted on said first pivoting axle arm and on second pivoting axle arm; a first rotatable disc mounted on said first axle; a cable drive connecting said motor and said first rotatable disc for rotating said first rotatable disc; a cover for said first axle; a second axle mounted on said cover; an idler wheel mounted on said second axle; an endless track running around said first rotatable disc and said idler wheel; and said first rotatable disc being the drive disc for moving the endless track.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a housing operatively connecting with said stabilizer plate; a motor operatively connecting with said housing; a propelling means for propelling said mechanical unit; said motor and said propelling means operatively connecting and with said motor driving said propelling means to move said mechanical unit; a first pivoting axle arm operatively connecting with said housing; a second pivoting axle arm operatively connecting with said housing; a first axle mounted on said first pivoting axle arm and on second pivoting axle arm; a first rotatable disc mounted on said first axle; a cable drive connecting said motor and said first rotatable disc for rotating said first rotatable disc; a cover for said first axle; a second axle mounted on said cover; an idler wheel mounted on said second axle; an endless track running around said first rotatable disc and said idler wheel; said first rotatable disc being the drive disc for moving the endless track; and said endless track having a roughened exterior surface for traction purposes.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a housing operatively connecting with said stabilizer plate; a motor operatively connecting with said housing; a propelling means for propelling said mechanical unit; said motor and said propelling means operatively connecting and with said motor driving said propelling means to move said mechanical unit; a first pivoting axle arm operatively connecting with said housing; a second pivoting axle arm operatively connecting with said housing; a first axle mounted on said first pivoting axle arm and on second pivoting axle arm; a first rotatable disc mounted on said first axle; a cable drive connecting said motor and said first rotatable disc for rotating said first rotatable disc; a cover for said first axle; a second axle mounted on said cover; said rotatable disc being a first sprocket; a second sprocket mounted on said second axle; a chain positioned around said first sprocket and said second sprocket; said first sprocket driving said second sprocket; a first wheel mounted on said first axle; and a second wheel mounted on said second axle.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a housing operatively connecting with said stabilizer plate; a motor operatively connecting with said housing; a propelling means for propelling said mechanical unit; said motor and said propelling means operatively connecting and with said motor driving said propelling means to move said mechanical unit; a first pivoting axle arm operatively connecting with said housing; a second pivoting axle arm operatively connecting with said housing; a first axle mounted on said first pivoting axle arm and on second pivoting axle arm; a first rotatable disc mounted on said first axle; a cable drive connecting said motor and said first rotatable disc for rotating said first rotatable disc; a cover for said first axle; a second axle mounted on said cover; said rotatable disc being a first sprocket; a second sprocket mounted on said second axle; a chain positioned around said first sprocket and said second sprocket; said first sprocket driving said second sprocket; a first wheel mounted on said first axle; a second wheel mounted on said second axle; and said first wheel and said second wheel have roughened peripheral surfaces for traction purposes.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a housing operatively connecting with said stabilizer plate; a motor operatively connecting with said housing; a propelling means for propelling said mechanical unit; said motor and said propelling means operatively connecting and with said motor driving said propelling means to move said mechanical unit; a first pivoting axle arm operatively connecting with said housing; a second pivoting axle arm operatively connecting with said housing; a first axle mounted on said first pivoting axle arm and on second pivoting axle arm; a first rotatable disc mounted on said first axle; a cable drive connecting said motor and said first rotatable disc for rotating said first rotatable disc; a cover for said first axle; a second axle mounted on said cover; said rotatable disc being a first pulley; a second pulley mounted on said second axle; a pulley belt positioned around said first pulley and said second pulley; said first pulley driving said second pulley; a first wheel mounted or said first axle; and a second wheel mounted on said second axle.

A mobile mechanical unit comprising a first bracket; a stabilizer plate operatively connecting with said first bracket; a first right double hinge bracket operatively and rotatably connecting with said first bracket and with a right support bracket; a first left double hinge bracket operatively and rotatably connecting with said first bracket and with a left support bracket; a pivotal tie bar operatively and rotatably connecting with said stabilizer plate 108; a second right double hinge bracket operatively and rotatably connecting with said pivotal tie bar and with said right support bracket; a second left double hinge bracket operatively and rotatably connecting with said pivotal tie bar and with said left support bracket; said right support bracket operatively contacting with a first ground engaging means; said left support bracket 120 operatively contacting with a second ground engaging means; a middle support positioned between said right support bracket and said left support bracket and operatively connecting with said first bracket; said middle support operatively and rotatably connecting with a third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; a housing operatively connecting with said stabilizer plate; a motor operatively connecting with said housing; a propelling means for propelling said mechanical unit; said motor and said propelling means operatively connecting and with said motor driving said propelling means to move said mechanical unit; a first pivoting axle arm operatively connecting with said housing; a second pivoting axle arm operatively connecting with said housing; a first axle mounted on said first pivoting axle arm and on second pivoting axle arm; a first rotatable disc mounted on said first axle; a cable drive connecting said motor and said first rotatable disc for rotating said first rotatable disc; a cover for said first axle; a second axle mounted on said cover; said rotatable disc being a first pulley; a second pulley mounted on said second axle; a pulley belt positioned around said first pulley and said second pulley; said first pulley driving said second pulley; a first wheel mounted or said first axle; a second wheel mounted on said second axle; and said first wheel and said second wheel have roughened peripheral surfaces for traction purposes.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; and said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; and operatively connecting said motor and said propelling means and for said motor to drive said propelling means to move said mechanical unit.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; rotatably positioning a steering bar on said middle support; and operatively connecting said steering bar with said third ground engaging means.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; rotatably positioning a steering bar on said middle support; operatively connecting said steering bar with said third ground engaging means; and operatively connecting a servo motor with said steering bar for rotating said steering bar and said third ground engaging means for steering said mechanical unit.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; rotatably positioning a steering bar on said middle support; operatively connecting said steering bar with said third ground engaging means; operatively connecting a servo motor with said steering bar for rotating said steering bar and said third ground engaging means for steering said mechanical unit; and operatively connecting a source of electrical energy with said servo motor.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; rotatably positioning a steering bar on said middle support; operatively connecting said steering bar with said third ground engaging means; operatively connecting a servo motor with said steering bar for rotating said steering bar and said third ground engaging means for steering said mechanical unit; operatively connecting a source of electrical energy with said servo motor; and remotely positioning said source of electricity with respect to said servo motor.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third a ground engaging means to be at different elevations with respect to each other; rotatably positioning a steering bar on said middle support; operatively connecting said steering bar with said third ground engaging means; operatively connecting a servo motor with said steering bar for rotating said steering bar and said third ground engaging means for steering said mechanical unit; operatively connecting a source of electrical energy with said servo motor; positioning an electrical battery on said mechanical unit and operatively connecting said electrical battery with said servo motor; and positioning an antenna on said mechanical unit for receiving electromagnetic signals for controlling the operation of the servo motor and for operatively connecting with said servo motor.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and positioning an electromagnetic sensing means on said mechanical unit for sensing said electromagnetic waves and for indicating that said electromagnetic waves have been sensed.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and operatively connecting a rope with said mechanical unit for a rescue purpose.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and selecting as said first ground engaging means, as said second ground engaging means, and as said third ground engaging means skis.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting as said first ground engaging means, as said second ground engaging means, and as said third ground engaging means skis;

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting as said first ground engaging means, as said second ground engaging means, and as said third ground engaging means skis; operatively connecting a tensioning means with said middle support and with said third ground engaging means, said ski; selecting said tensioning means to comprise a first spring and connecting said first spring with said middle support and with said ski forwardly of said middle support; and selecting a second spring and connecting said second spring with said middle support and with said ski aft of said middle support.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and selecting said first ground engaging means, said second ground engaging means, and said third ground engaging means to be wheels.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting said first ground engaging means, said second ground engaging means, and said third ground engaging means to be wheels; selecting said first ground engaging means to be a first assembly comprising two spaced apart wheels; operatively connecting said first assembly with said housing; selecting said second ground engaging means to be a second assembly comprising two spaced apart wheels; operatively connecting said second assembly with said housing; and spacing apart said first assembly and said second assembly.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and selecting said first ground engaging means, said second ground engaging means, and said third ground engaging means to be endless tracks.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said tight support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting said first ground engaging means, said second ground engaging means, and said third ground engaging means to be endless tracks; and operatively connecting a tensioning means with said middle support and with said third ground engaging means, said endless track.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting said first ground engaging means, said second ground engaging means, and said third ground engaging means to be endless tracks; operatively connecting a tensioning means with said middle support and with said third ground engaging means, said endless track; connecting said tensioning means comprising a first spring with said middle support and with said third ground engaging means forwardly of said middle support; and connecting a second spring with said middle support and with said third ground engaging means aft of said middle support.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting said first ground engaging means, said second ground engaging means, and said third ground engaging means to be endless tracks; selecting said first ground engaging means to be a first assembly comprising two spaced apart discs with a track running around said discs; operatively connecting said first assembly with said housing; selecting said second ground engaging means to be a second assembly comprising two spaced apart discs with a track running around said discs; operatively connecting said second assembly with said housing; spacing apart said first assembly and said second assembly; selecting said third ground engaging means to be a third assembly comprising two spaced apart discs with a track running around said discs; and positioning said third assembly forwardly of said first assembly and said second assembly and operatively connecting with said housing.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and selecting as said first ground engaging means, as said second ground engaging means, and as said third ground engaging means pontoons.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third it ground engaging means to be at different elevations with respect to each other; selecting as said first ground engaging means, as said second ground engaging means, and as said third ground engaging means pontoons; selecting said tensioning means to comprise a first spring and connecting said first spring with said middle support and with said pontoon forwardly of said middle support; and selecting a second spring and connecting said second spring with said middle support and with said pontoon aft of said middle support.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting as said first ground engaging means, as said second ground engaging means, and as said third ground engaging means skis; spacing apart said first ground engaging means and said second ground engaging means; positioning said third ground engaging means being between said first ground engaging means and said second ground engaging means; positioning a pivot pin on said third ground engaging means; and mounting a fourth ski on said pivot pin and said fourth ski being capable of rotating on said pivot pin to direct the direction of movement of said mobile mechanical unit.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting as said first ground engaging means, as said second ground engaging means, and as said third ground engaging means skis; spacing apart said first ground engaging means and said second ground engaging means; positioning said third ground engaging means being between said first ground engaging means and said second ground engaging means; positioning a pivot pin on said third ground engaging means; mounting a fourth ski on said pivot pin and said fourth ski being capable of rotating on said pivot pin to direct the direction of movement of said mobile mechanical unit; selecting as said first ground engaging means, as said second ground engaging means, and as said third ground engaging means skis; spacing apart said first ground engaging means and said second ground engaging means; positioning said third ground engaging means being between said first ground engaging means and said second ground engaging means; positioning a pivot pin on said third ground engaging means; and mounting a wheel assembly on said pivot pin and said wheel assembly being capable of rotating on said pivot pin to direct the direction of movement of said unit.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; and connecting a cable drive with said motor and with said first rotatable disc for rotating said first rotatable disc.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; operatively connecting a first tensioning means with said first pivoting axle arm and said unit; and operatively connecting a second tensioning means with said second pivoting axle arm and said unit.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; operatively connecting a first tensioning means with said first pivoting axle arm and said unit; operatively connecting a second tensioning means with said second pivoting axle arm and said unit; selecting said first tensioning means to be a spring; and selecting said second tensioning means to be a spring.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; and selecting said rotatable disc to have an uneven peripheral surface for traction purposes.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; selecting a cover for said first axle; selecting a second axle mounted on said cover; mounting an idler wheel on said second axle; running an endless track around said first rotatable disc and said idler wheel; and said first rotatable disc being the drive disc for moving the endless track.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; selecting a cover for said first axle; selecting a second axle mounted on said cover; mounting an idler wheel on said second axle; running an endless track around said first rotatable disc and said idler wheel; said first rotatable disc being the drive disc for moving the endless track; and selecting said endless track to have a roughened exterior surface for traction purposes.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; selecting a cover for said first axle; mounting a second axle on said cover; selecting said rotatable disc to be a first sprocket; mounting a second sprocket on said second axle; positioning a chain around said first sprocket and said second sprocket; positioning said first sprocket in a driving relationship with said second sprocket; mounting a first wheel on said first axle; and mounting a second wheel mounted on said second axle.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; a operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; selecting a cover for said first axle; mounting a second axle on said cover; selecting said rotatable disc to be a first sprocket; mounting a second sprocket on said second axle; positioning a chain around said first sprocket and said second sprocket; positioning said first sprocket in a driving relationship with said second sprocket; mounting a first wheel on said first axle; mounting a second wheel mounted on said second axle; selecting said first wheel and said second wheel to have roughened peripheral surfaces for traction purposes.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; selecting a cover for said first axle; mounting a second axle mounted on said cover; selecting as said rotatable disc a first pulley; mounting a second pulley on said second axle; positioning a pulley belt around said first pulley and said second pulley; said first pulley being in a driving relationship with said second pulley; mounting a first wheel on said first axle; and mounting a second wheel on said second axle.

A process for making a mobile mechanical unit comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; selecting a cover for said first axle; mounting a second axle mounted on said cover; selecting as said rotatable disc a first pulley; mounting a second pulley on said second axle; positioning a pulley belt around said first pulley and said second pulley; said first pulley being in a driving relationship with said second pulley; mounting a first wheel on said first axle; mounting a second wheel on said second axle; and selecting said first wheel and said second wheel to have roughened peripheral surfaces for traction purposes.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; and said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; and operatively connecting said motor and said propelling means and for said motor to drive said propelling means to move said mechanical unit.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; rotatably positioning a steering bar on said middle support; and operatively connecting said steering bar with said third ground engaging means.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, a said rotatability of said second left double hinge bracket with said pivotal tie bar and with said left support bracket allows said first ground engaging means, said second ground engaging means and said third ground engaging means to be at different elevations with respect to each other; rotatably positioning a steering bar on said middle support; operatively connecting said steering bar with said third ground engaging means; and operatively connecting a servo motor with said steering bar for rotating said steering bar and said third ground engaging means for steering said mechanical unit.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; rotatably positioning a steering bar on said middle support; operatively connecting said steering bar with said third ground engaging means; operatively connecting a servo motor with said steering bar for rotating said steering bar and said third ground engaging means for steering said mechanical unit; and operatively connecting a source of electrical energy with said servo motor.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; rotatably positioning a steering bar on said middle support; operatively connecting said steering bar with said third ground engaging means; operatively connecting a servo motor with said steering bar for rotating said steering bar and said third ground engaging means for steering said mechanical unit; operatively connecting a source of electrical energy with said servo motor; and remotely positioning said source of electricity with respect to said servo motor.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; rotatably positioning a steering bar on said middle support; operatively connecting said steering bar with said third ground engaging means; operatively connecting a servo motor with said steering bar for rotating said steering bar and said third ground engaging means for steering said mechanical unit; operatively connecting a source of electrical energy with said servo motor; positioning an electrical battery on said mechanical unit and operatively connecting said electrical battery with said servo motor; and positioning an antenna on said mechanical unit for receiving electromagnetic signals for controlling the operation of the servo motor and for operatively connecting with said servo motor.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and positioning an electromagnetic sensing means on said mechanical unit for sensing said electromagnetic waves and for indicating that said electromagnetic waves have been sensed.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket a with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and operatively connecting a rope with said mechanical unit for a rescue purpose.

A mobile mechanical unit made by a process comprising selecting a first bracket; operatively connecting a stabilizer plate with said first bracket; operatively and rotatably connecting a first right double hinge bracket with said first bracket and with aright support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and selecting as said first ground engaging means, as said second ground engaging means, and as said third ground engaging means skis.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and operatively connecting a tensioning means with said middle support and with said third ground engaging means, said ski.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a tensioning means with said middle support and with said third ground engaging means, said ski; selecting said tensioning means to comprise a first spring and connecting said first spring with said middle support and with said ski forwardly of said middle support; and selecting a second spring and connecting said second spring with said middle support and with said ski aft of said middle support.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and selecting said first ground engaging means, said second ground engaging means, and said third ground engaging means to be wheels.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting said first ground engaging means, said second ground engaging means, and said third ground engaging means to be wheels; selecting said first ground engaging means to be a first assembly comprising two spaced apart wheels; operatively connecting said first assembly with said housing; selecting said second ground engaging means to be a second assembly comprising two spaced apart wheels; operatively connecting said second assembly with said housing; and spacing apart said first assembly and said second assembly.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and selecting said first ground engaging means, said second ground engaging means, and said third ground engaging means to be endless tracks.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting said first ground engaging means, said second ground engaging means, and said third ground engaging means to be endless tracks; and operatively connecting a tensioning means with said middle support and with said third ground engaging means, said endless track.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting said first ground engaging means, said second ground engaging means, and said third ground engaging means to be endless tracks; operatively connecting a tensioning means with said middle support and with said third ground engaging means, said endless track; connecting said tensioning means comprising a first spring with said middle support and with said third ground engaging means forwardly of said middle support; and connecting a second spring with said middle support and with said third ground engaging means aft of said middle support.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting said first ground engaging means, said second ground engaging means, and said third ground engaging means to be endless tracks; selecting said first ground engaging means to be a first assembly comprising two spaced apart discs with a track running around said discs; operatively connecting said first assembly with said housing; selecting said second ground engaging means to be a second assembly comprising two spaced apart discs with a track running around said discs;

operatively connecting said second assembly with said housing; spacing apart said first assembly and said second assembly; selecting said third ground engaging means to be a third assembly comprising two spaced apart discs with a track running around said discs; and positioning said third assembly forwardly of said first assembly and said second assembly and operatively connecting with said housing.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; and selecting as said first ground engaging means, as said second ground engaging means, and as said third ground engaging means pontoons.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting as said first ground engaging means, as said second ground engaging means, and as said third ground engaging means pontoons; selecting said tensioning means to comprise a first spring and connecting said first spring with said middle support and with said pontoon forwardly of said middle support; and selecting a second spring and connecting said second spring with said middle support and with said pontoon aft of said middle support.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting as said first ground engaging means, as said second ground engaging means, and as said third ground engaging means skis; spacing apart said first ground engaging means and said second ground engaging means; positioning said third ground engaging means being between said first ground engaging means and said second ground engaging means; positioning a pivot pin on said third ground engaging means; and mounting a fourth ski on said pivot pin and said fourth ski being capable of rotating on said pivot pin to direct the direction of movement of said mobile mechanical unit.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; selecting as said first ground engaging means, as said second ground engaging means, and as said third ground engaging means skis; spacing apart said first ground engaging means and said second ground engaging means; positioning said third ground engaging means being between said first ground engaging means and said second ground engaging means; positioning a pivot pin on said third ground engaging means; mounting a fourth ski on said pivot pin and said fourth ski being capable of rotating on said pivot pin to direct the direction of movement of said mobile mechanical unit; selecting as said first ground engaging means, as said second ground engaging means, and as said third ground engaging means skis; spacing apart said first ground engaging means and said second ground engaging means; positioning said third ground engaging means being between said first ground engaging means and said second ground engaging means; positioning a pivot pin on said third ground engaging means; and mounting a wheel assembly on said pivot pin and said wheel assembly being capable of rotating on said pivot pin to direct the direction of movement of said unit.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; and connecting a cable drive with said motor and with said first rotatable disc for rotating said first rotatable disc.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; cooperatively connecting a first tensioning means with said first pivoting axle arm and said unit; and operatively connecting a second tensioning means with said second pivoting axle arm and said unit.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; selecting said first tensioning means to be a spring; and selecting said second tensioning means to be a spring.

A mobile mechanical unit made by a process comprising selecting a first bracket; operatively connecting a stabilizer plate with said first bracket; operatively and rotatably connecting a first right double hinge bracket with said first bracket and with a right support bracket; coperatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first tensioning means with said first pivoting axle arm and said unit; operatively connecting a second tensioning means with said second pivoting axle arm and said unit; and selecting said rotatable disc to have an uneven peripheral surface for traction purposes.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; selecting a cover for said first axle; selecting a second axle mounted on said cover; mounting an idler wheel on said second axle; running an endless track around said first rotatable disc and said idler wheel; and said first rotatable disc being the drive disc for moving the endless track.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; and selecting said endless track to have a roughened exterior surface for traction purposes.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; selecting a cover for said first axle; selecting a second axle mounted on said cover; mounting an idler wheel on said second axle; running an endless track around said first rotatable disc and said idler wheel; said first rotatable disc being the drive disc for moving the endless track; selecting a cover for said first axle; mounting a second axle on said cover; selecting said rotatable disc to be a first sprocket; mounting a second sprocket on said second axle; positioning a chain around said first sprocket and said second sprocket; positioning said first sprocket in a driving relationship with said second sprocket; mounting a first wheel on said first axle; and mounting a second wheel mounted on said second axle.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; selecting a cover for said first axle; selecting a second axle mounted on said cover; mounting an idler wheel on said second axle; running an endless track around said first rotatable disc and said idler wheel; said first rotatable disc being the drive disc for moving the endless track; selecting a cover for said first axle; mounting a second axle on said cover; selecting said rotatable disc to be a first sprocket; mounting a second sprocket on said second axle; positioning a chain around said first sprocket and said second sprocket; positioning said first sprocket in a driving relationship with said second sprocket; mounting a first wheel on said first axle; mounting a second wheel mounted on said second axle; and selecting said first wheel and said second wheel to have roughened peripheral surfaces for traction purposes.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; selecting a cover for said first axle; mounting a second axle mounted on said cover; selecting as said rotatable disc a first pulley; mounting a second pulley on said second axle; positioning a pulley belt around said first pulley and said second pulley; said first pulley being in a driving relationship with said second pulley; mounting a first wheel on said first axle; and mounting a second wheel on said second axle.

A mobile mechanical unit made by a process comprising selecting a first bracket; operatively connecting a stabilizer plate with said first bracket; operatively and rotatably connecting a first right double hinge bracket with said first bracket and with a right support bracket; operatively and rotatably connecting a first left double hinge bracket with said first bracket and with a left support bracket; operatively and rotatably connecting a pivotal tie bar with said stabilizer plate; operatively and rotatably connecting a second right double hinge bracket with said pivotal tie bar and with said right support bracket; operatively and rotatably connecting a second left double hinge bracket with said pivotal tie bar and with said left support bracket; operatively contacting said right support bracket with a first ground engaging means; operatively contacting said left support bracket with a second ground engaging means; positioning a middle support between said right support bracket and said left support bracket and operatively connecting said middle support with said first bracket; operatively and rotatably connecting said middle support with said third ground engaging means; said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other; operatively connecting a housing with said stabilizer plate; operatively connecting a motor with said housing; operatively connecting a propelling means with said unit for propelling said mechanical unit; operatively connecting said motor and said propelling means and for said motor to drive said propelling means to move said mechanical unit; operatively connecting a first pivoting axle arm with said housing; operatively connecting a second pivoting axle arm with said housing; positioning a first axle on said first pivoting axle arm and on said second pivoting axle arm; mounting a first rotatable disc on said first axle; connecting a cable drive with said motor and with said first rotatable disc for rotating said first rotatable disc; selecting a cover for said first axle; selecting a second axle mounted on said cover; mounting an idler wheel on said second axle; running an endless track around said first rotatable disc and said idler wheel; said first rotatable disc being the drive disc for moving the endless track; selecting a cover for said first axle; mounting a second axle on said cover; selecting said rotatable disc to be a first sprocket; mounting a second sprocket on said second axle; positioning a chain around said first sprocket and said second sprocket; positioning said first sprocket in a driving relationship with said second sprocket; mounting a first wheel on said first axle; mounting a second wheel mounted on said second axle; selecting said first wheel and said second wheel to have roughened peripheral surfaces for traction purposes; and selecting said first wheel and said second wheel to have roughened peripheral surfaces for traction purposes.

What I claim is:

1. A mobile mechanical unit comprising:
   a. a first bracket;
   b. a stabilizer plate operatively connecting with said first bracket;
   c. a first right double hinge bracket operatively and rotatably connecting with said first bracket and with a right support bracket;
   d. a first left double hinge bracket operatively and rotatably connecting with said first bracket and with a left support bracket;
   e. a pivotal tie bar operatively and rotatably connecting with said stabilizer plate 108;
   f. a second right double hinge bracket operatively and rotatably connecting with said pivotal tie bar and with said right support bracket;
   g. a second left double hinge bracket operatively and rotatably connecting with said pivotal tie bar and with said left support bracket;
   h. said right support bracket operatively contacting with a first ground engaging means;
   i. said left support bracket 120 operatively contacting with a second ground engaging means;
   j. a middle support positioned between said right support bracket and said left support bracket and operatively connecting with said first bracket;
   k. said middle support operatively and rotatably connecting with a third ground engaging means; and
   l. said rotatability of said stabilizer plate and said pivotal tie bar, said rotatability of said first right double hinge bracket and said first bracket and said right support bracket, said rotatability of said first left double hinge bracket and said first bracket and'said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other.

2. A mobile mechanical unit according to claim 1 and comprising:
   a. a housing operatively connecting with said stabilizer plate;
   b. a motor operatively connecting with said housing;
   c. a propelling means for propelling said mechanical unit; and
   d. said motor and said propelling means operatively connecting and with said motor driving said propelling means to move said mechanical unit.

3. A mechanical unit according to claim 2 and comprising:
   a. a first pivoting axle arm operatively connecting with said housing;
   b. a second pivoting axle arm operatively connecting with said housing;
   c. a first axle mounted on said first pivoting axle arm and on second pivoting axle arm;
   d. a first rotatable disc mounted on said first axle; and
   e. a cable drive connecting said motor and said first rotatable disc for rotating said first rotatable disc.

4. A mechanical unit according to claim 1 and comprising:
   a. a steering bar rotatably positioned on said middle support; and
   b. said steering bar operatively connecting with said third ground engaging means.

5. A mechanical unit according to claim 4 and comprising:
   a. a servo motor operatively connecting with said steering bar for rotating said steering bar and said third ground engaging means for steering said mechanical unit.

6. A mechanical unit according to claim 5 and comprising:
   a. a source of electrical energy operatively connecting with said servo motor.

7. A mechanical unit according to claim 6 and comprising:
   a. said source of electricity being an electrical battery positioned on said mechanical unit and operatively connecting with said servo motor;
   b. an antenna on said mechanical unit for receiving electromagnetic signals for controlling the operation of the servo motor and operatively connecting with said servo motor.

8. A mechanical unit according to claim 1 and comprising:
   a. an electromagnetic sensing means on said mechanical unit for sensing electromagnetic waves and for indicating that said electromagnetic waves have been sensed.

9. A mechanical unit according to claim 1 and comprising:
   a. a rope operatively connecting with said mechanical unit for a rescue purpose.

10. A mechanical unit according to claim 1 and comprising:
    a. said first ground engaging means, said second ground engaging means, and said third ground engaging means being skis.

11. A mechanical unit according to claim 1 and comprising:
    a. said first ground engaging means, said second ground engaging means, and said third ground engaging means being wheels.

12. A mechanical unit according to claim 1 and comprising:
    a. said first ground engaging means, said second ground engaging means, and said third ground engaging means being endless tracks.

13. A mechanical unit according to claim 12 and comprising:
    a. said first ground engaging means being a first assembly comprising two spaced apart discs with a track running around said discs;
    b. said first assembly operatively connecting with said housing;
    c. said second ground engaging means being a second assembly comprising two spaced apart discs with a track running around said discs;
    d. said second assembly operatively connecting with said housing;
    e. said first assembly and said second assembly being spaced apart;
    f. said third ground engaging means being a third assembly comprising two spaced apart discs with a track running around said two spaced apart discs; and
    g. said third assembly being positioned forwardly of said first assembly and said second assembly and operatively connecting with said housing.

14. A mechanical unit according to claim 1 and comprising:
    a. said first ground engaging means, said second ground engaging means, and said third ground engaging means being pontoons.

15. A mechanical unit according to claim 1 and comprising:
   a. said first ground engaging means, said second ground engaging means, and said third ground engaging means being skis;
   b. said first ground engaging means, said second ground engaging means, and being spaced apart;
   c. said third ground engaging means being between said first ground engaging means and said second ground engaging means;
   d. a pivot pin on said third ground engaging means; and
   e. a fourth ski mounted on said pivot pin and being capable of rotating on said pivot pin to direct the direction of movement of said mechanical unit.

16. A mechanical unit according to claim 15 and comprising:
   a. said first ground engaging means, said second ground engaging means, and said third ground engaging means being skis;
   b. said first ground engaging means, said second ground engaging means, and being spaced apart;
   c. said third ground engaging means being between said first ground engaging means and said second ground engaging means;
   d. a pivot pin on said third ground engaging means; and
   e. a wheel assembly mounted on said pivot pin and being capable of rotating on said pivot pin to direct the direction of movement of said unit.

17. A process for making a mobile mechanical unit comprising:
   a. selecting a first bracket;
   b. operatively connecting a stabilizer plate with said first bracket;
   c. operatively and rotatably connecting a first right double hinge bracket with said first bracket and with a right support bracket;
   d. operatively and rotatably connecting a first left double hinge bracket with said first bracket and with a left support bracket;
   e. operatively and rotatably connecting a pivotal tie bar with said stabilizer plate;
   f. operatively and rotatably connecting a second right double hinge bracket with said pivotal tie bar and with said right support bracket;
   g. operatively and rotatably connecting a second left double hinge bracket with said pivotal tie bar and with said left support bracket;
   h. operatively contacting said right support bracket with a first ground engaging means;
   i. operatively contacting said left support bracket with a second ground engaging means;
   j. positioning a middle support between said right support bracket and said left support bracket and operatively connecting said middle support with said first bracket;
   k. operatively and rotatably connecting said middle support with said third ground engaging means; and
   l. said rotatability of said stabilizer plate and said pivotal tie bar, said rotatability of said first right double hinge bracket and said first bracket and said right support bracket, said rotatability of said first left double hinge bracket and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other.

18. A process for making a mobile mechanical unit according to claim 17 and comprising:
   a. operatively connecting a housing with said stabilizer plate;
   b. operatively connecting a motor with said housing;
   c. operatively connecting a propelling means with said unit for propelling said mechanical unit; and
   d. operatively connecting said motor and said propelling means and for said motor to drive said propelling means to move said mechanical unit.

19. A mobile mechanical unit made by a process comprising:
   a. selecting a first bracket;
   b. operatively connecting a stabilizer plate with said first bracket;
   c. operatively and rotatably connecting a first right double hinge bracket with said first bracket and with a right support bracket;
   d. operatively and rotatably connecting a first left double hinge bracket with said first bracket and with a left support bracket;
   e. operatively and rotatably connecting a pivotal tie bar with said stabilizer plate;
   f. operatively and rotatably connecting a second right double hinge bracket with said pivotal tie bar and with said right support bracket;
   g. operatively and rotatably connecting a second left double hinge bracket with said pivotal tie bar and with said left support bracket;
   h. operatively contacting said right support bracket with a first ground engaging means;
   i. operatively contacting said left support bracket with a second ground engaging means;
   j. positioning a middle support between said right support bracket and said left support bracket and operatively connecting said middle support with said first bracket;
   k. operatively and rotatably connecting said middle support with said third ground engaging means; and
   l. said rotatability of said stabilizer plate and said pivotal tie bar, said rotatability of said first right double hinge bracket and said first bracket and said right support bracket, said rotatability of said first left double hinge bracket (70) and said first bracket and said left support bracket, said rotatability of said second right double hinge bracket with said pivotal tie bar and with said right support bracket, said rotatability of said second left double hinge bracket with said pivotal tie bar and with said left support bracket allows said first ground engaging means, said second ground engaging means and said third ground engaging means to be at different elevations with respect to each other.

20. A mobile mechanical unit according to claim 19 and made by a process comprising:
   a. operatively connecting a housing with said stabilizer plate;
   b. operatively connecting a motor with said housing;
   c. operatively connecting a propelling means with said unit for propelling said mechanical unit; and
   d. operatively connecting said motor and said propelling means and for said motor to drive said propelling means to move said mechanical unit.

* * * * *